United States Patent
Kozuka et al.

(10) Patent No.: US 11,039,045 B2
(45) Date of Patent: *Jun. 15, 2021

(54) VIDEO DISPLAY SYSTEM AND VIDEO DISPLAY METHOD

(71) Applicant: PANASONIC INTELLECTUAL PROPERTY MANAGEMENT CO., LTD., Osaka (JP)

(72) Inventors: Masayuki Kozuka, Osaka (JP); Masaya Yamamoto, Kyoto (JP); Yoshiichiro Kashiwagi, Kyoto (JP); Toshiroh Nishio, Osaka (JP); Kazuhiko Kouno, Osaka (JP); Hiroshi Yahata, Osaka (JP); Takeshi Hirota, Osaka (JP); Yoshihiro Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 117 days.

This patent is subject to a terminal disclaimer.

(21) Appl. No.: 16/332,751

(22) PCT Filed: Feb. 26, 2018

(86) PCT No.: PCT/JP2018/006860
§ 371 (c)(1),
(2) Date: Mar. 12, 2019

(87) PCT Pub. No.: WO2019/012728
PCT Pub. Date: Jan. 17, 2019

(65) Prior Publication Data
US 2020/0413019 A1 Dec. 31, 2020

Related U.S. Application Data

(60) Provisional application No. 62/532,524, filed on Jul. 14, 2017.

(51) Int. Cl.
*H04N 9/73* (2006.01)
*H04N 9/64* (2006.01)
(Continued)

(52) U.S. Cl.
CPC ............... *H04N 5/20* (2013.01); *H04N 9/646* (2013.01); *H04N 9/68* (2013.01); *H04N 9/73* (2013.01); *H04N 9/77* (2013.01); *H04N 21/47* (2013.01)

(58) Field of Classification Search
CPC ............ H04N 9/67; H04N 9/68; H04N 9/646; H04N 9/643; H04N 9/73; H04N 9/77;
(Continued)

(56) References Cited

U.S. PATENT DOCUMENTS

2013/0038790 A1* 2/2013 Seetzen .................... G09G 5/02
348/453
2014/0210847 A1 7/2014 Knibbeler et al.
(Continued)

FOREIGN PATENT DOCUMENTS

JP 2016-100039 A 5/2016
JP 6104411 B2 3/2017
(Continued)

OTHER PUBLICATIONS

White Paper Blu-ray Disc Read-Only Format (Ultra HD Blu-ray), Audio Visual Application Format Specifications for BD-ROM Version 3.1, Aug. 2016, http://www.blu-raydisc.com/Assets/Downloadablefile/BD-ROM_Part3_V3.1_WhitePaper_160729_clean.pdf.
(Continued)

*Primary Examiner* — Sherrie Hsia
(74) *Attorney, Agent, or Firm* — McDermott Will and Emery LLP

(57) ABSTRACT

A video display system includes: a tone mapping processor that performs a tone mapping process of converting a
(Continued)

luminance of a video by using conversion characteristics according to a maximum luminance of the video; and a display that displays the video that has undergone the tone mapping process. The tone mapping processor switches between a first tone mapping process of dynamically changing the conversion characteristics according to a time-depend change in the maximum luminance of the video and a second tone mapping process that is performed using constant conversion characteristics irrespective of the time-depend change in the maximum luminance of the video. When the tone mapping process used is switched from the second tone mapping process to the first tone mapping process, the conversion characteristics used is changed gradually or stepwise from the constant conversion characteristics to dynamically changing conversion characteristics over a plurality of frames.

8 Claims, 23 Drawing Sheets

(51) Int. Cl.
*H04N 9/77* (2006.01)
*H04N 5/20* (2006.01)
*H04N 21/47* (2011.01)
*H04N 9/68* (2006.01)

(58) Field of Classification Search
CPC ........ H04N 9/74; H04N 11/20; H04N 7/0135; H04N 7/012
USPC ....... 348/655, 656, 659–661, 708, 712, 713, 348/589, 600, 453, 649, 651, 654
See application file for complete search history.

(56) References Cited

U.S. PATENT DOCUMENTS

| | | |
|---|---|---|
| 2015/0256860 A1 | 9/2015 | Kunkel et al. |
| 2016/0005201 A1 | 1/2016 | Kunkel et al. |
| 2016/0080716 A1 | 3/2016 | Atkins et al. |
| 2016/0100147 A1 | 4/2016 | Kim et al. |
| 2016/0212399 A1 | 7/2016 | Uchimura |
| 2016/0330513 A1 | 11/2016 | Toma et al. |
| 2017/0186141 A1 | 6/2017 | Ha et al. |
| 2017/0243612 A1 | 8/2017 | Yahata et al. |
| 2017/0251161 A1 | 8/2017 | Toma et al. |
| 2017/0330312 A1 | 11/2017 | Nam |
| 2018/0018932 A1 | 1/2018 | Atkins |
| 2018/0278985 A1 | 9/2018 | De Haan et al. |
| 2018/0376194 A1 | 12/2018 | Oh |
| 2019/0020852 A1 | 1/2019 | Bak et al. |
| 2019/0043233 A1 | 2/2019 | Kim et al. |
| 2019/0251680 A1 | 8/2019 | Kozuka et al. |
| 2019/0335149 A1 | 10/2019 | Hirota et al. |
| 2019/0394384 A1 | 12/2019 | Yamamoto et al. |
| 2020/0236334 A1 | 7/2020 | Hirota et al. |
| 2020/0258543 A1 | 8/2020 | Yahata et al. |

FOREIGN PATENT DOCUMENTS

| | | |
|---|---|---|
| WO | 2014/130213 A1 | 8/2014 |
| WO | 2016/027423 A1 | 2/2016 |
| WO | 2016/074999 A1 | 5/2016 |

OTHER PUBLICATIONS

International Search Report and Written Opinion issued in International Patent Application No. PCT/JP2018/006860, dated May 15, 2018; with partial English translation.
International Search Report and Written Opinion issued in International Patent Application No. PCT/JP2018/006861, dated May 15, 2018; with partial English translation.
Non-Final Office Action issued in U.S. Appl. No. 16/331,464, dated Mar. 20, 2020.
Non-Final Office Action issued in U.S. Appl. No. 16/331,456, dated Feb. 19, 2020.
Notice of Allowance issued in U.S. Appl. No. 16/332,738, dated Jul. 1, 2020.
Non-Final Office Action issued in U.S. Appl. No. 16/333,885, dated May 14, 2020.
Extended European Search Report issued in European Patent Application No. 18820540.5, dated Apr. 30, 2020.
Extended European Search Report issued in European Patent Application No. 18820085.1, dated May 4, 2020.
Extended European Search Report issued in European Patent Application No. 18831862.0, dated Apr. 24, 2020.
Extended European Search Report issued in European Patent Application No. 18831863.8, dated Apr. 29, 2020.
International Search Report and Written Opinion dated May 15, 2018 in International Patent Application No. PCT/JP2018/006856; with partial English translation.
International Search Report and Written Opinion dated May 15, 2018 in International Patent Application No. PCT/JP2018/006857; with partial English translation.
International Search Report and Written Opinion issued in International Patent Application No. PCT/JP2018/006862, dated May 15, 2018; with partial English translation.
International Search Report and Written Opinion issued in International Patent Application No. PCT/JP2018/006863, dated May 15, 2018; with partial English translation.
Non-Final Office Action issued in U.S. Appl. No. 16/333,894, dated Oct. 28, 2020.
Extended European Search Report issued in EP patent application No. 18852740.2, dated Nov. 2, 2020.
Extended European Search Report issued in EP patent application No. 18852787.3, dated Nov. 2, 2020.

\* cited by examiner

FIG. 8A

| ITEM | SUBITEM | EXAMPLE VALUE | UNIT, LIMITATION, ETC. |
|---|---|---|---|
| MAIN VIDEO DYNAMIC METADATA | MAXIMUM LUMINANCE | 550 | NIT |
| | AVERAGE LUMINANCE | 200 | NIT |
| GRAPHICS OVERLAY FLAG | | ON | ON OR OFF |

FIG. 8B

| ITEM | SUBITEM | EXAMPLE VALUE | UNIT, LIMITATION, ETC. |
|---|---|---|---|
| MAIN VIDEO DYNAMIC METADATA | MAXIMUM LUMINANCE | 550 | NIT |
| | AVERAGE LUMINANCE | 200 | NIT |
| GRAPHICS OVERLAY FLAG | SUBTITLES OVERLAY FLAG | ON | ON OR OFF |
| | MENU OVERLAY FLAG | OFF | ON OR OFF |

FIG. 11A
```
For i=1 to n
{
        if ABS( T0i - T1i ) > Di then output "NO", break;
}
output "YES";
```
FIG. 11B
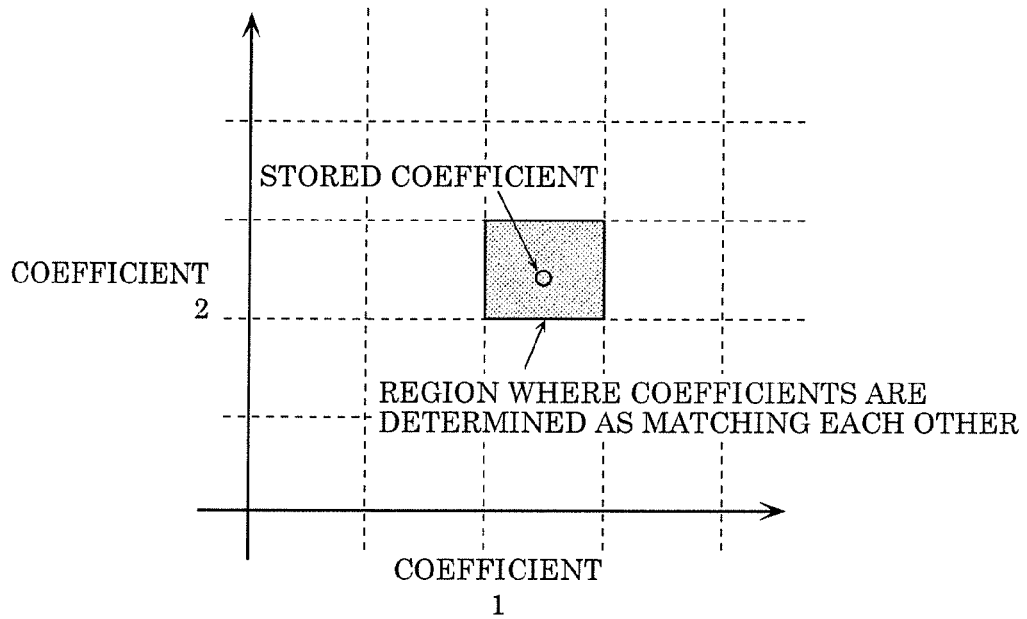
FIG. 11C
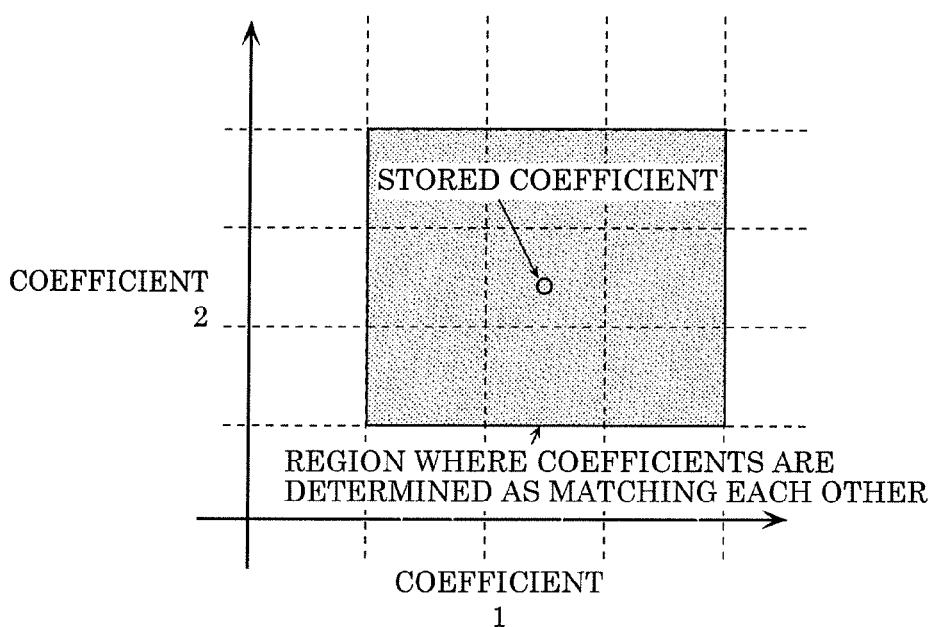

FIG. 17A

| ITEM | SUBITEM | EXAMPLE VALUE | UNIT, LIMITATION, ETC. |
|---|---|---|---|
| MAIN VIDEO DYNAMIC METADATA | MAXIMUM LUMINANCE | 550 | NIT |
| | AVERAGE LUMINANCE | 200 | NIT |
| GRAPHICS OVERLAY FLAG | SUBTITLES OVERLAY FLAG | ON | ON OR OFF |
| | MENU OVERLAY FLAG | ON | ON OR OFF |
| GRAPHICS LUMINANCE INFORMATION | MAXSLL | 250 | NIT |
| | MAXGLL | 300 | NIT |

FIG. 17B

| ITEM | SUBITEM | EXAMPLE VALUE | UNIT, LIMITATION, ETC. |
|---|---|---|---|
| MAIN VIDEO DYNAMIC METADATA | MAXIMUM LUMINANCE | 550 | NIT |
| | AVERAGE LUMINANCE | 200 | NIT |
| GRAPHICS LUMINANCE INFORMATION | MAXSLL | 0 | SUBTITLES ARE NOT PRESENT (CORRESPONDING TO SUBTITLES SUPERIMPOSITION FLAG BEING OFF) |
| | | 1 | SUBTITLES ARE PRESENT AT LUMINANCE OF 2 NITS |
| | | 2 | SUBTITLES ARE PRESENT AT LUMINANCE OF 4 NITS |
| | | 255 | SUBTITLES ARE PRESENT, BUT LUMINANCE IS NOT KNOWN |
| | MAXGLL | 0 | MENU IS NOT PRESENT (CORRESPONDING TO MENU SUPERIMPOSITION FLAG BEING OFF) |
| | | 1 | MENU IS PRESENT AT LUMINANCE OF 4 NITS |
| | | 2 | MENU IS PRESENT AT LUMINANCE OF 8 NITS |
| | | 255 | MENU IS PRESENT, BUT LUMINANCE IS NOT KNOWN |

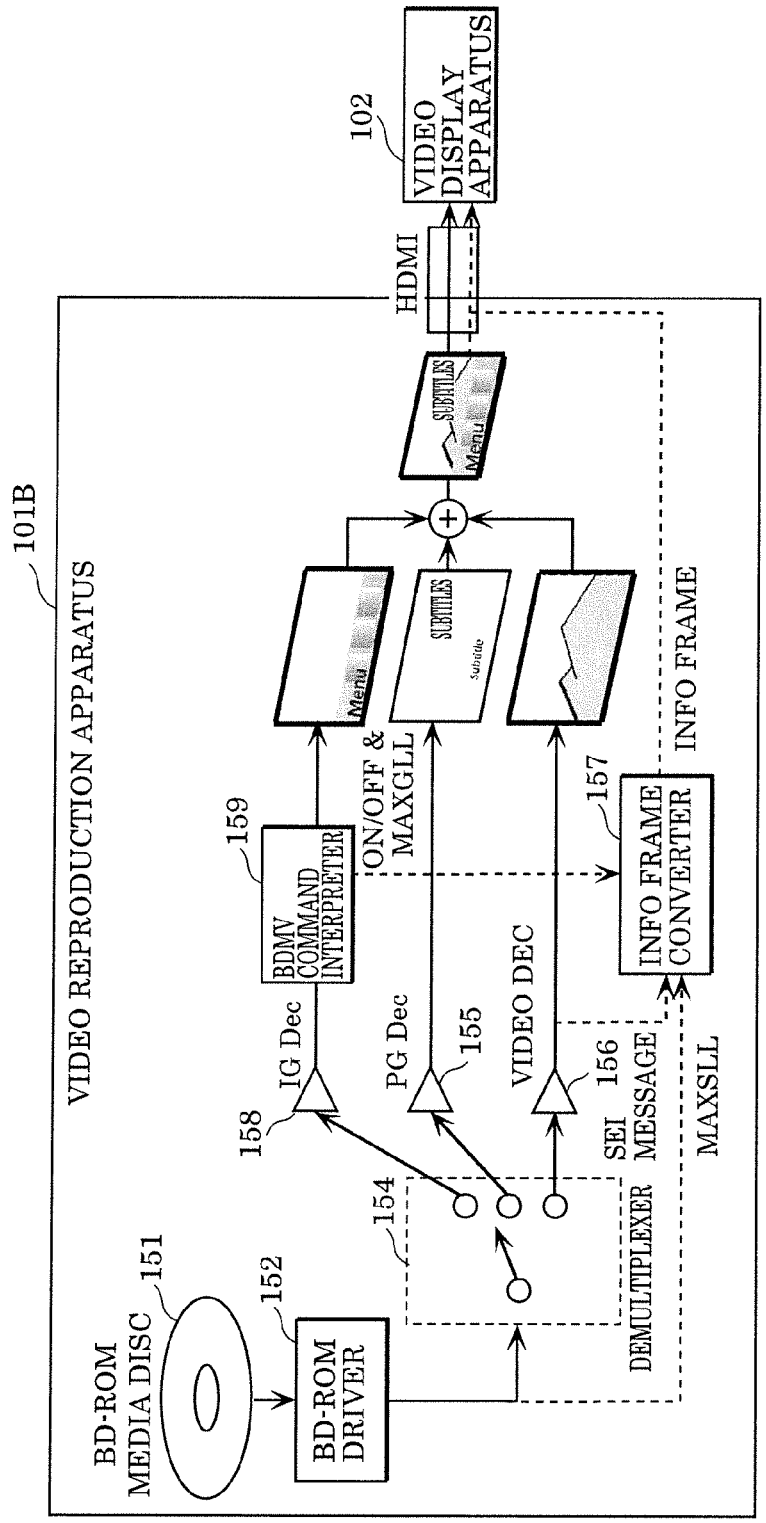

VIDEO DISPLAY SYSTEM AND VIDEO DISPLAY METHOD

CROSS-REFERENCE OF RELATED APPLICATIONS

This application is the U.S. National Phase under 35 U.S.C. § 371 of International Patent Application No. PCT/JP2018/006860, filed on Feb. 26, 2018, which in turn claims the benefit of U.S. Provisional Application No. 62/532,524, filed on Jul. 14, 2017, the entire disclosures of which Applications are incorporated by reference herein.

TECHNICAL FIELD

The present disclosure relates to a video display system and a video display method for displaying a video.

BACKGROUND ART

Patent Literature (PTL) 1 discloses a method and a system for mapping graphics on an image of an HDR (High Dynamic Range) video.

CITATION LIST

Patent Literature

PTL 1: Japanese Patent No. 6104411

Non-Patent Literature

NPL 1: White Paper Blu-ray Disc Read-Only Format (Ultra HD Blu-ray), Audio Visual Application Format Specifications for BD-ROM Version 3.1, August 2016, http://www.blu-raydisc.com/Assets/Downloadablefile/BD-ROM_Part3_V3.1_WhitePaper_160729_clean.pdf

SUMMARY OF THE INVENTION

Technical Problem

The present disclosure provides a video display system and a video display method that can improve the quality of a video displayed.

Solution to Problem

A video display system according to an aspect of the present disclosure includes: a tone mapping processor that performs a tone mapping process of converting a luminance of a video by using conversion characteristics according to a maximum luminance of the video; and a display that displays the video that has undergone the tone mapping process. The tone mapping processor switches between a first tone mapping process of dynamically changing the conversion characteristics according to a time-depend change in the maximum luminance of the video and a second tone mapping process that is performed using constant conversion characteristics irrespective of the time-depend change in the maximum luminance of the video. When the tone mapping process used is switched from the second tone mapping process to the first tone mapping process, the conversion characteristics used is changed gradually or stepwise from the constant conversion characteristics to dynamically changing conversion characteristics over a plurality of frames.

Advantageous Effect of Invention

The present disclosure can provide a video display system and a video display method that can improve the quality of a video displayed.

BRIEF DESCRIPTION OF DRAWINGS

FIG. 8A is a diagram showing an example of main video dynamic metadata and a graphics overlay flag according to Embodiment 1.
FIG. 8B is a diagram showing an example of main video dynamic metadata and a graphics overlay flag according to Embodiment 1.
FIG. 11A is a diagram illustrating determining processing performed by a comparator according to Embodiment 1.
FIG. 11B is a diagram illustrating determining processing performed by the comparator according to Embodiment 1.
FIG. 11C is a diagram illustrating determining processing performed by the comparator according to Embodiment 1.
FIG. 17A is a diagram showing an example of main video dynamic metadata, a graphics overlay flag, and graphics luminance information according to Embodiment 3.
FIG. 17B is a diagram showing an example of main video dynamic metadata and graphics luminance information according to Embodiment 3.
FIG. 20 is a block diagram of a video display system according to Embodiment 4.

DESCRIPTION OF EXEMPLARY EMBODIMENTS

Embodiment

1-1. Background

Figure 1:
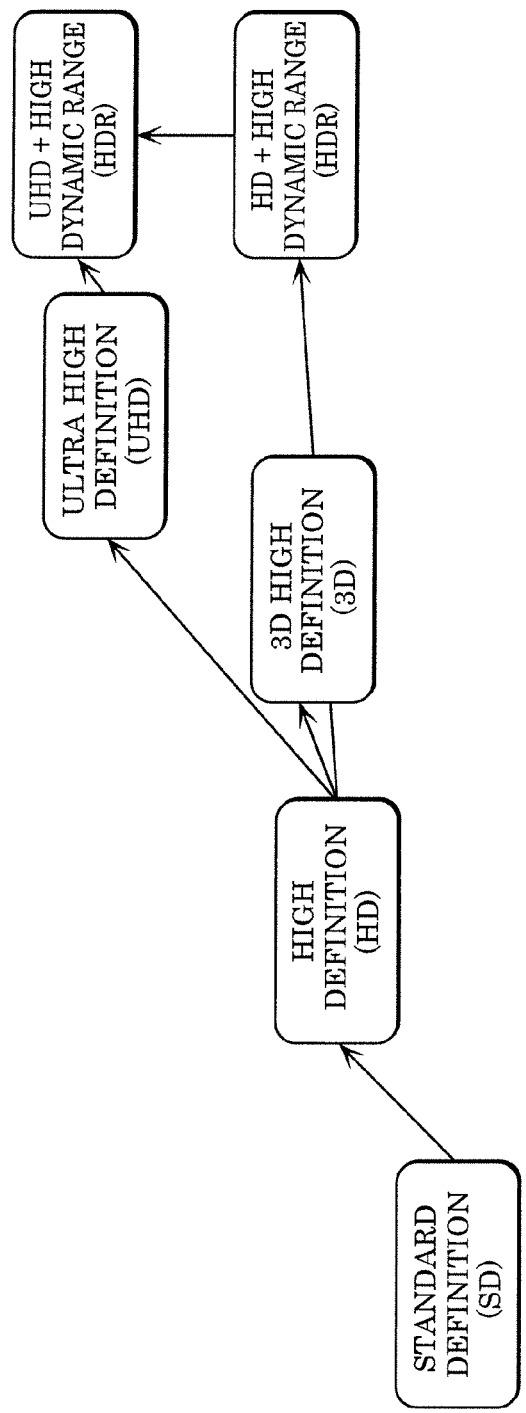
FIG. 1 is a diagram illustrating the evolution of imaging technology.

First, the transition of imaging technology will be described with reference to FIG. 1. FIG. 1 is a diagram illustrating the evolution of imaging technology.

In order to enhance video image quality, conventionally, the focus has been given to increase the number of pixels displayed. Accordingly, standard definition (SD) videos (720×480 pixels) and high definition (HD) videos (1920×1080 pixels) are now widely used.

In recent years, in order to achieve even higher image quality, introduction of ultra high definition (UHD) videos (3840×1920 pixels), or so-called 4K resolution videos (with a 4K resolution of 4096×2048 pixels) has started.

Along with the introduction of 4K resolution videos, consideration is also given to expanding the dynamic range, expanding the color gamut, adding or improving the frame rate, and the like.

Among these, with respect to the dynamic range, HDR (High Dynamic Range) rendering is receiving increased attention as a method for representing bright light, such as specular reflection light, that cannot be represented by a currently used television signal to be more close to reality while maintaining low light signal gradation. Specifically, conventional television signals are called SDR (Standard Dynamic Range) signals, and the highest luminance is 100 nits. In contrast, in HDR signals, the highest luminance is expected to be up to 1000 nits or more. For HDR signals, standardization of mastering display standards is currently undertaken by SMPTE (Society of Motion Picture & Television Engineers), ITU-R (International Telecommunications Union Radio communications Sector), and the like.

Specific applications of HDR include, as with HD and UHD, broadcasting, packaged media (Blu-ray® disc, and the like), internet delivery, and the like.

1-2. Relationship Between Generation of Master, Delivery Methods, and Display Apparatuses FIG. 2 is a diagram illustrating the relationship between video production, delivery methods, and display apparatuses when a new video representation is introduced into content.

Figure 2:
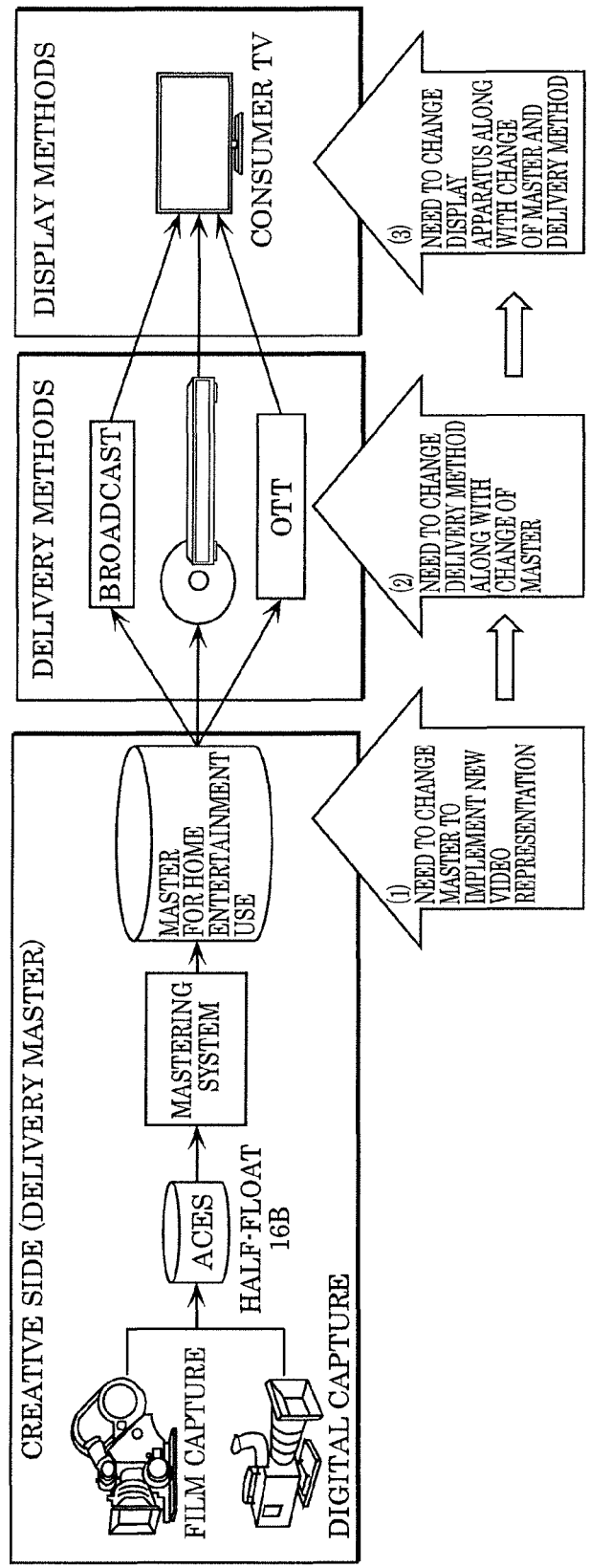
FIG. 2 is a diagram illustrating the relationship between video production, delivery methods, and display apparatuses when a new video representation is introduced into content.

In the case where a new video representation is introduced (for example, the number of pixels is increased) so as to enhance video image quality, as shown in FIG. 2, it is necessary to (1) change a master for home entertainment on the video production side. Along with this change, it is also necessary to (2) update the delivery method such as broadcasting, communication, or a packaged medium, and also (3) update the display apparatus such as a television set or a projector for displaying the video.

1-3. Tone Mapping

Tone mapping is processing for adjusting, based on the relationship between the luminance of an HDR video and the maximum luminance (Display Peak Luminance: DPL) of a video display apparatus, the luminance of the video to be less than or equal to DPL by converting the luminance of the video if the maximum luminance (Maximum Content Luminance Level: MaxCLL) of the video exceeds DPL. Through this processing, the video can be displayed without losing information near the maximum luminance of the video. The conversion depends on the characteristics of the video display apparatus, and also depends on how to display the video, and thus different conversion characteristics are used for each video display apparatus.

Figure 3A:
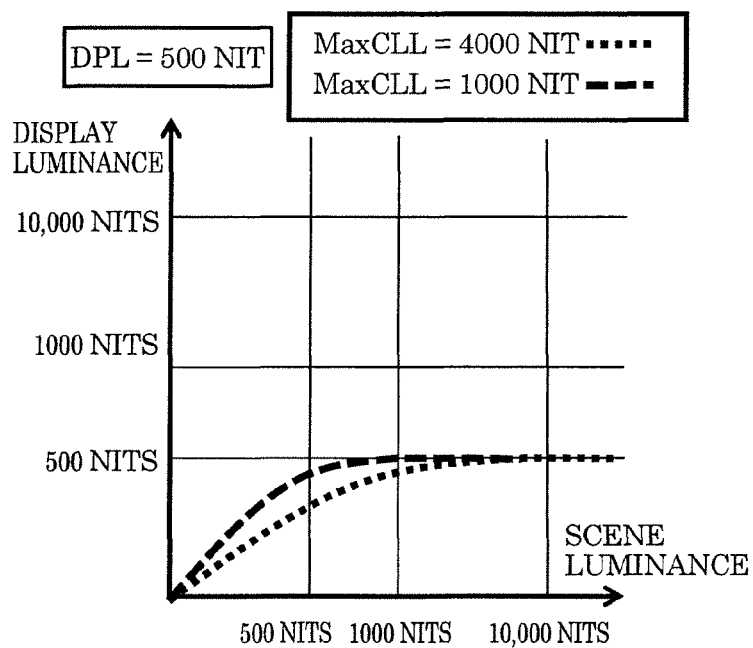
FIG. 3A is a diagram showing an example of tone mapping.
Figure 3B:
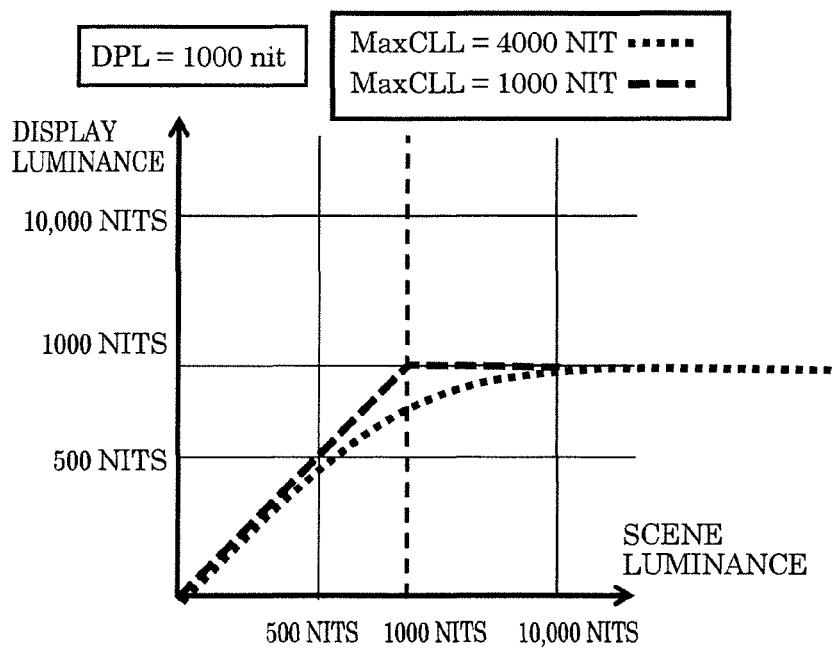
FIG. 3B is a diagram showing an example of tone mapping.

FIGS. 3A and 3B are diagrams showing examples of tone mapping. FIG. 3A shows a case where DPL is 500 nits, and FIG. 3B shows a case where DPL is 1000 nits. Also, FIGS. 3A and 3B each show an example of tone mapping performed when a video having a MaxCLL of 1000 nits is displayed and an example of tone mapping performed when a video having a MaxCLL of 4000 nits is displayed.

As shown in FIG. 3A, in the case where DPL is 500 nits, in both videos, the luminance is converted such that the video can be displayed at up to MaxCLL below 500 nits, but the degree of conversion is higher in the video having a higher MaxCLL.

As shown in FIG. 3B, in the case where DPL is 1000 nits, in the video having a MaxCLL of 1000 nits, tone mapping is not performed. In the video having a MaxCLL of 4000 nits, tone mapping is performed so as to convert the luminance from 4000 nits to 1000 nits, and the video is displayed at that luminance.

1-4. Dynamic Metadata and Dynamic Tone Mapping

Figure 4A:
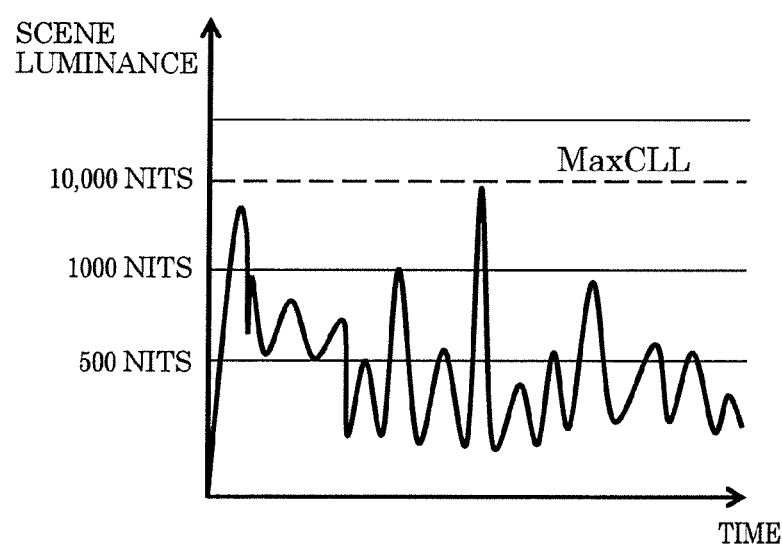
FIG. 4A is a diagram showing an example of static tone mapping.
Figure 4B:
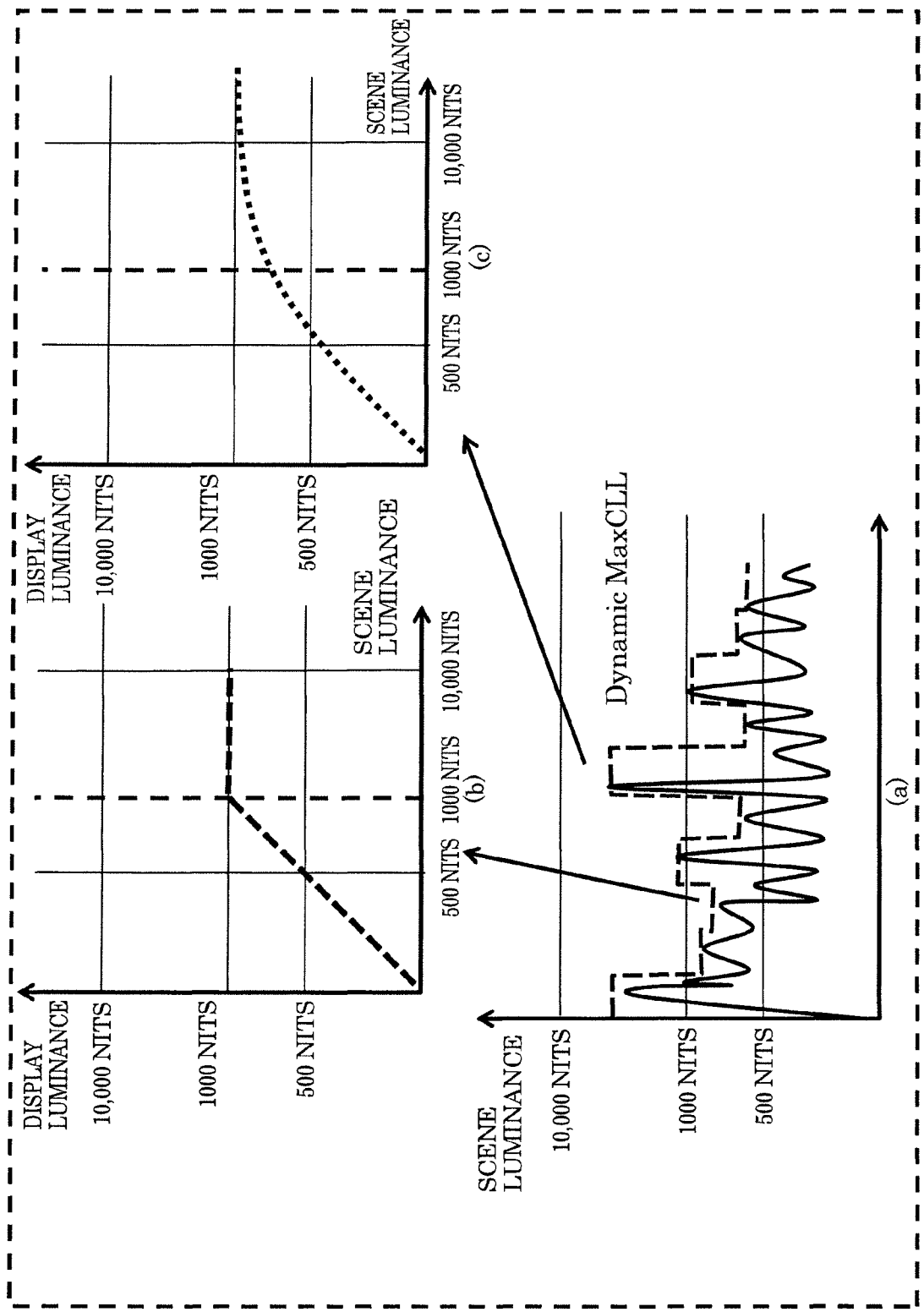
FIG. 4B is a diagram showing an example of dynamic tone mapping.

FIG. 4A is a diagram showing an example of tone mapping using static metadata. FIG. 4B is a diagram showing an example of dynamic tone mapping using dynamic metadata.

As shown in FIG. 4A, in the case where static metadata (MaxCLL) is used, MaxCLL indicates the highest luminance in a video sequence, and thus the video display apparatus only perform tone mapping using a fixed curve on the video sequence. In contrast, as shown in (a) in FIG. 4B, in the case where metadata suitable according to the luminance that varies with time (here, referred to as Dynamic MaxCLL) is used, the video display apparatus does not perform tone mapping when the luminance is low ((b) in FIG. 4B), and performs tone mapping when the luminance is high ((c) in FIG. 4B). In this way, optimal tone mapping suitable for the luminance that varies with time can be implemented.

1-5. Overlaying Graphics on Video

Figure 5:
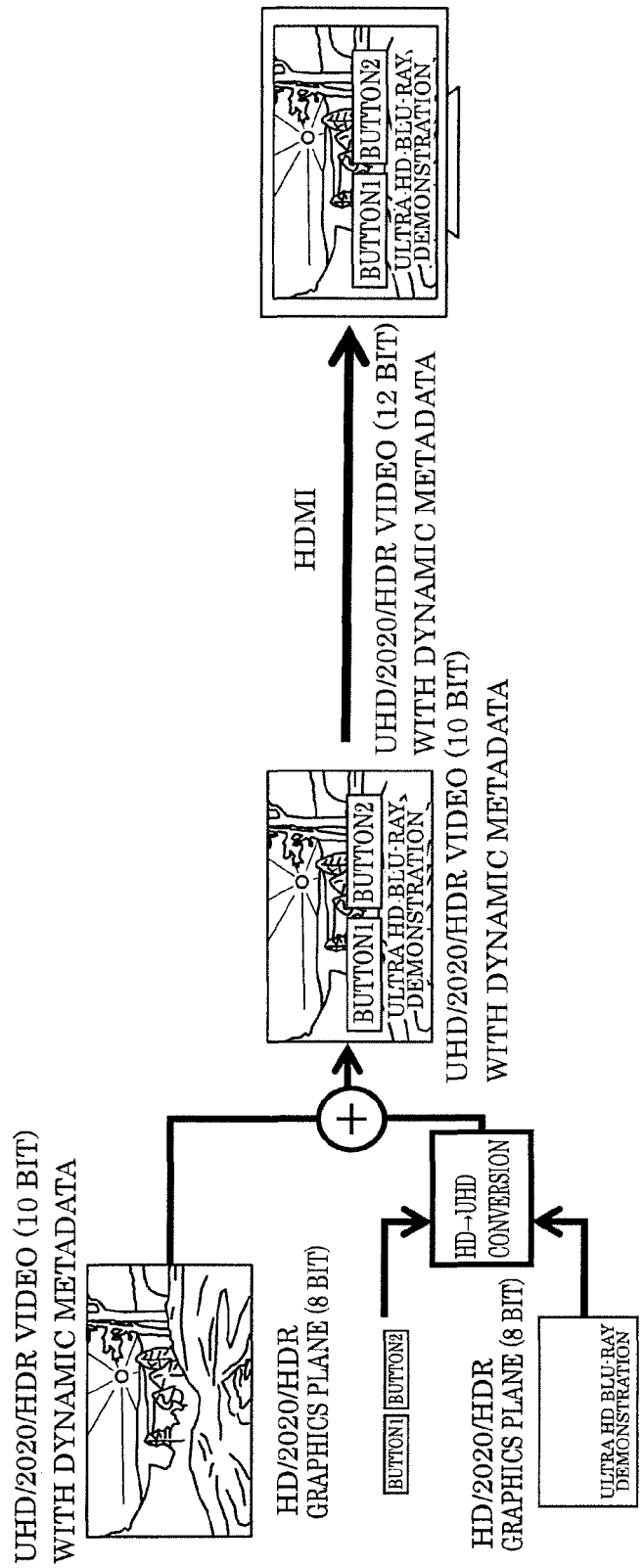
FIG. 5 is a diagram showing an example in which graphics are overlaid on a moving image, and the resulting moving image is displayed.

FIG. 5 is a diagram showing an example in which graphics such as a menu and subtitles are overlaid on a moving image, and the moving image is displayed on a video display apparatus. Here, an example of Ultra HD Blu-ray is shown.

A set of moving images before graphics are overlaid will be referred to as a main video. With Ultra HD Blu-ray, graphics are prepared in HD resolution. A video reproduction apparatus performs HD-UHD conversion on the graphics in HD resolution so as to generate graphics in UHD resolution. Then, the video reproduction apparatus overlays the obtained graphics in UHD resolution on the main video having UHD resolution. Then, the video reproduction apparatus transmits the video resulting from the overlay process to a video display apparatus via HDMI® (High-Definition Multimedia Interface). The video display apparatus displays the transmitted video in HDR.

Also, the video reproduction apparatus determines dynamic metadata based on the variation of the luminance of the main video with time, and transmits the dynamic metadata to the video display apparatus via HDMI. The video display apparatus performs dynamic tone mapping on a video signal of the video obtained by overlaying subtitles and menus on the main video based on the transmitted dynamic metadata.

The same applies to an HDR video that is displayed through an OTT (over the top) service via broadcasting or communication and in which a menu or subtitles are overlaid on a main video, and the resulting video is displayed on a video display apparatus.

1-6. Problem Arising when Performing Dynamic Tone Mapping on Video Data where Graphics are Overlaid on Moving Image In the dynamic metadata method, metadata regarding the luminance of the HDR video such as luminance distribution is designated for each frame, and the metadata is transmitted to the video display apparatus together with the video signal. The video display apparatus performs processing such as luminance conversion based on the transmitted metadata according to the display capabilities of the video display apparatus such as maximum luminance. The dynamic metadata method as described above is receiving increased attention as a method for displaying a video at a constant quality as much as possible irrespective of the display performance of a video display apparatus such as luminance.

However, dynamic metadata varies with time, and thus there is a problem in that a video that needs to be displayed stably is not displayed stably.

If the video to be displayed is a video or a set of so-called moving images that is simultaneously edited or supervised, processing can be performed considering the state of the video to some degree. When graphics data such as subtitles or a menu whose luminance is essentially constant and does not vary at all is overlaid on a main video composed of a set of moving images as described above and displayed, due to the processing that uses dynamic metadata, a negative effect occurs such as variation of the luminance or color of the graphics that essentially needs to be constant. This negative effect becomes more prominent as the luminance of the main video is higher and the luminance of the video display apparatus is lower.

Figure 6:
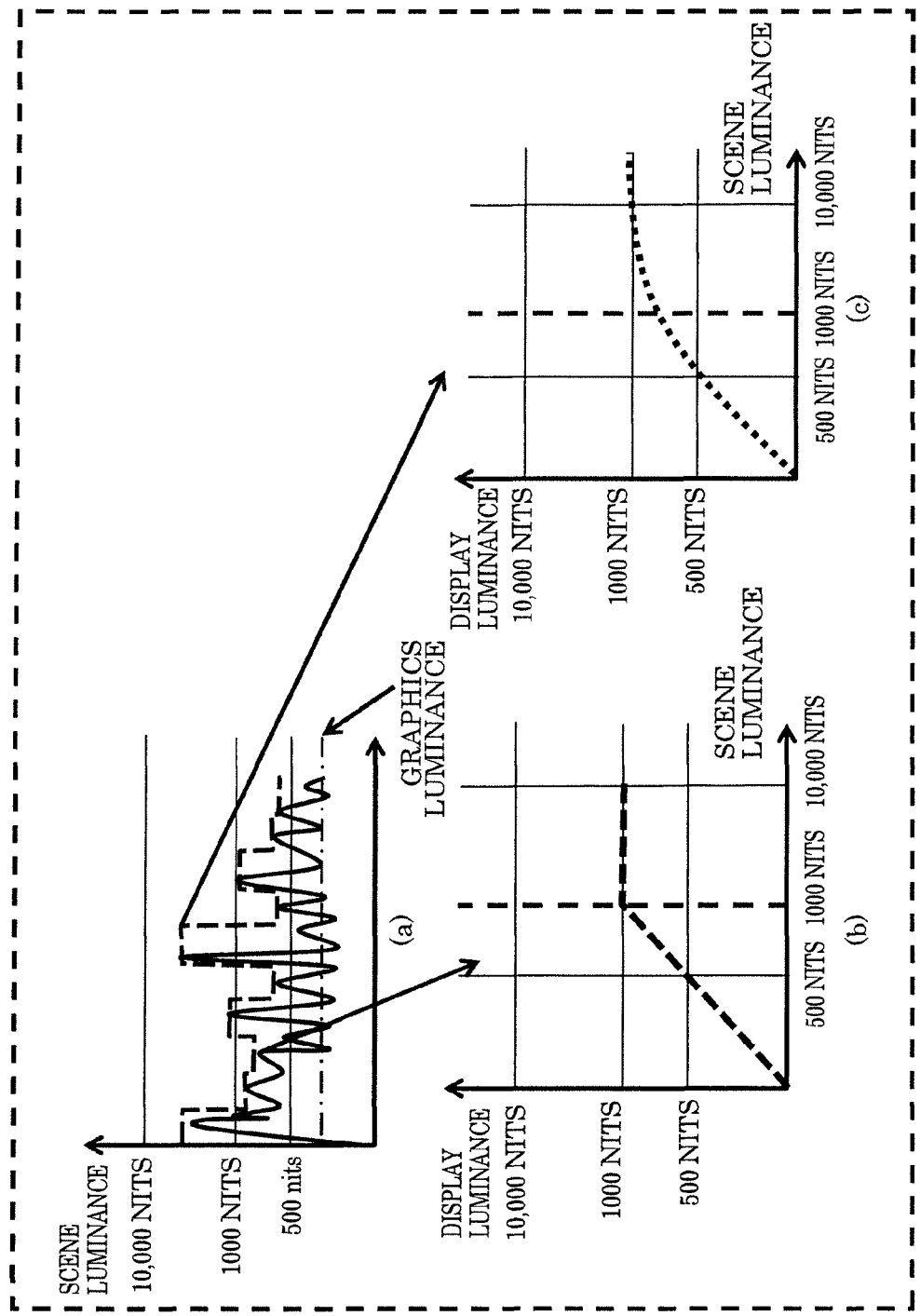
FIG. 6 is a diagram showing the influence of dynamic tone mapping when graphics are overlaid on a main video.

FIG. 6 is a diagram showing the influence of dynamic tone mapping when graphics are overlaid on a main video. It is assumed here that, as shown in (a) in FIG. 6, graphics to be overlaid has a luminance of 350 nits. As shown in (b) in FIG. 6, in a section in which the luminance of the main video is low, tone mapping is not performed, and thus the graphics are displayed on a video display apparatus at a luminance of 350 nits that is the original luminance of the graphics. On the other hand, as shown in (c) in FIG. 6, in a section in which the luminance of the main video is high, tone mapping is performed, and thus the graphics are displayed on the video display apparatus at a luminance lower than 350 nits. In this way, the graphics luminance that essentially needs to be constant varies with time, resulting in an undesired state. In this example, only the influence on the luminance is considered, but in an actual video display apparatus, the influence may also be exerted on color components, and thus colors may also be affected.

1-7. Solution

As a means for avoiding the problem described above, a method may be conceived in which the position information of graphics to be overlaid is transmitted to the video display apparatus, and dynamic metadata is not used in an area where the graphics are displayed. However, it is very difficult to implement this method because it is necessary to transmit information that indicates whether graphics are displayed in the entire region of the display screen, and also necessary to make determinations for each display pixel in the processing performed by the video display apparatus.

To address the problem described above, in the present disclosure, the video reproduction apparatus transmits a "graphics overlay flag" that indicates whether or not graphics are overlaid on the main video to the video display apparatus as dynamic metadata information. Graphics include a menu and subtitles, and thus the video reproduction apparatus may transmit a "menu overlay flag" and a "subtitles overlay flag" to the video display apparatus as the "graphics overlay flag".

The video display apparatus switches dynamic tone mapping between on and off or changes the intensity of dynamic tone mapping according to the state of the menu overlay flag. With this configuration, the influence of dynamic tone mapping on the overlaid graphics can be reduced. Also, coexistence of a plurality of HDR formats in one stream or disc is allowed, and thus it is possible to use a format suitable for the video display apparatus.

Here, in the case where tone mapping is fixed so as to display a menu by terminating dynamic tone mapping, the tone mapping is continuous, and thus it does not cause a sense of discomfort. However, in the case where transition is made back to dynamic tone mapping from fixed tone mapping so as to remove the menu, optimal tone mapping at that time is different from the tone mapping when the menu was displayed. Accordingly, there is a first problem in that the tone mapping becomes discontinuous.

Also, in the method in which tone mapping is fixed by transmitting the subtitles overlay flag to the video display apparatus so as to display subtitles, the following problem arises. Subtitles are displayed for each dialogue, and thus a subtitles displayed state in which subtitles are displayed and a subtitles non-displayed state in which subtitles are not displayed are alternately repeated in a very short period of time. Accordingly, with the method in which tone mapping is fixed only in the period during which subtitles are displayed, a second problem arises in that it is difficult to perform display processing. Also, a problem arises when the display of subtitles is set to OFF in that the tone mapping becomes discontinuous, as in the case where the display of a menu is set to OFF.

In the present disclosure, the following solutions are used. According to a first method, when transition is made back to dynamic tone mapping from fixed tone mapping so as to remove a menu, the video display apparatus uses any one of the following methods to achieve the continuity of tone mapping.

(1) The video display apparatus fixes tone mapping until the fixed tone mapping substantially matches the tone mapping of the video to be displayed, and resumes dynamic tone mapping from a point where a sense of discomfort is not caused.

(2) The video display apparatus divides tone mapping into categories, and resumes dynamic tone mapping when the fixed tone mapping and the tone mapping of the video to be displayed are in the same or a similar category. The categories are determined based on the video luminance, luminance distribution, variance, or the like. Alternatively, the categories may be determined by the creator so as not to cause a sense of discomfort in the video.

(3) The video display apparatus changes the tone mapping to dynamic tone mapping specified when a menu is removed based on a predetermined time constant, and transitions back to normal dynamic tone mapping.

According to a second method, the video display apparatus uses any one of the following methods to solve the second problem described above.

(1) The video display apparatus fixes tone mapping when the display of subtitles is set to ON irrespective of individual subtitles display state.

(2) Apart from individual subtitles, a subtitles non-display period and a subtitles display period that have a predetermined length of time are defined, and the video display apparatus performs dynamic tone mapping during the non-display period, and fixes tone mapping during the display period.

Furthermore, in the case where the video display apparatus controls dynamic tone mapping according to ON/OFF of the display of subtitles, when transition is made back to dynamic tone mapping from fixed tone mapping by setting the display of subtitles effectively to OFF, the video display apparatus resumes normal dynamic tone mapping without causing a sense of discomfort by performing a method similar to the first method.

According to a third method, the video reproduction apparatus transmits MAXGLL (Maximum Graphics Luminance Level) or MAXSLL (Maximum Subtitle Luminance Level) information that indicates the effective maximum luminance of the menu or subtitles to the video display apparatus as a more specific method for informing the video display apparatus of ON/OFF of the effective display of the menu or subtitles.

MAXGLL and MAXSLL mentioned above are determined when main video data and graphics data such as a menu and subtitles that are displayed together with the main video data are produced. The video reproduction apparatus may acquire MAXGLL and MAXSLL together with the main video data, and transmit the main video data, MAXGLL, and MAXSLL to the video display apparatus. Alternatively, the video reproduction apparatus may generate MAXGLL or MAXSLL by acquiring the luminance of the menu or subtitles when the menu or subtitles are overlaid on the main video, and transmit the generated MAXGLL or MAXSLL to the video display apparatus.

In particular, in the case of the second method, the video reproduction apparatus or the video display apparatus needs to determine an effective subtitles display period, apart from subtitles data. Accordingly, timing information that indicates the effective subtitles display period is created together with the subtitles luminance information as metadata when the graphics data is produced, and the video reproduction apparatus transmits MAXSLL and the timing information to the video display apparatus by referring to the metadata.

With the first method described above, in the case where dynamic tone mapping is performed on the main video and graphics such as a menu or subtitles are overlaid, in a video display apparatus that entirely fixes dynamic tone mapping or fixes tone mapping at a luminance less than or equal to the graphics luminance, by not overlaying the graphics, it is possible to reduce a sense of discomfort when transition is made to normal dynamic tone mapping.

Also, in the case where the dynamic tone mapping process is changed according to ON/OFF of the display of subtitles, it may be difficult to change dynamic tone mapping such as when the period during which the display of subtitles is set to OFF is short. Even in this case, with the second method described above, by setting an effective ON period, it is possible to smoothly perform switching to dynamic tone mapping.

Also, with the third method described above, the graphics information regarding ON/OFF of the display of graphics such as a menu or subtitles or the luminance information are accurately informed to the video display apparatus, as a result of which the dynamic tone mapping process can be performed appropriately, and thus a high quality HDR video can be reproduced. Furthermore, by creating the timing information and the luminance information when data is produced, it is possible to implement a dynamic tone mapping process that more accurately reflects an intention of the producer.

2. Embodiment 1

In the present embodiment, the video display apparatus fixes tone mapping when displaying a menu, without performing dynamic tone mapping. Also, the video display apparatus achieves the continuity of tone mapping by using any one of the following methods when transition is made back to dynamic tone mapping from fixed tone mapping when removing the menu.

(1) The video display apparatus fixes tone mapping until the fixed tone mapping substantially matches the tone mapping of the video to be displayed, and resumes dynamic tone mapping from a point where a sense of discomfort is not caused.

(2) The video display apparatus divides tone mapping into categories, and resumes dynamic tone mapping when the fixed tone mapping and the tone mapping of the video to be displayed are in the same or a similar category. The categories are determined based on the video luminance, luminance distribution, variance, or the like. Alternatively, the categories may be determined by the creator so as not to cause a sense of discomfort in the video.

2-1. Configuration of Video Display System

Figure 7:
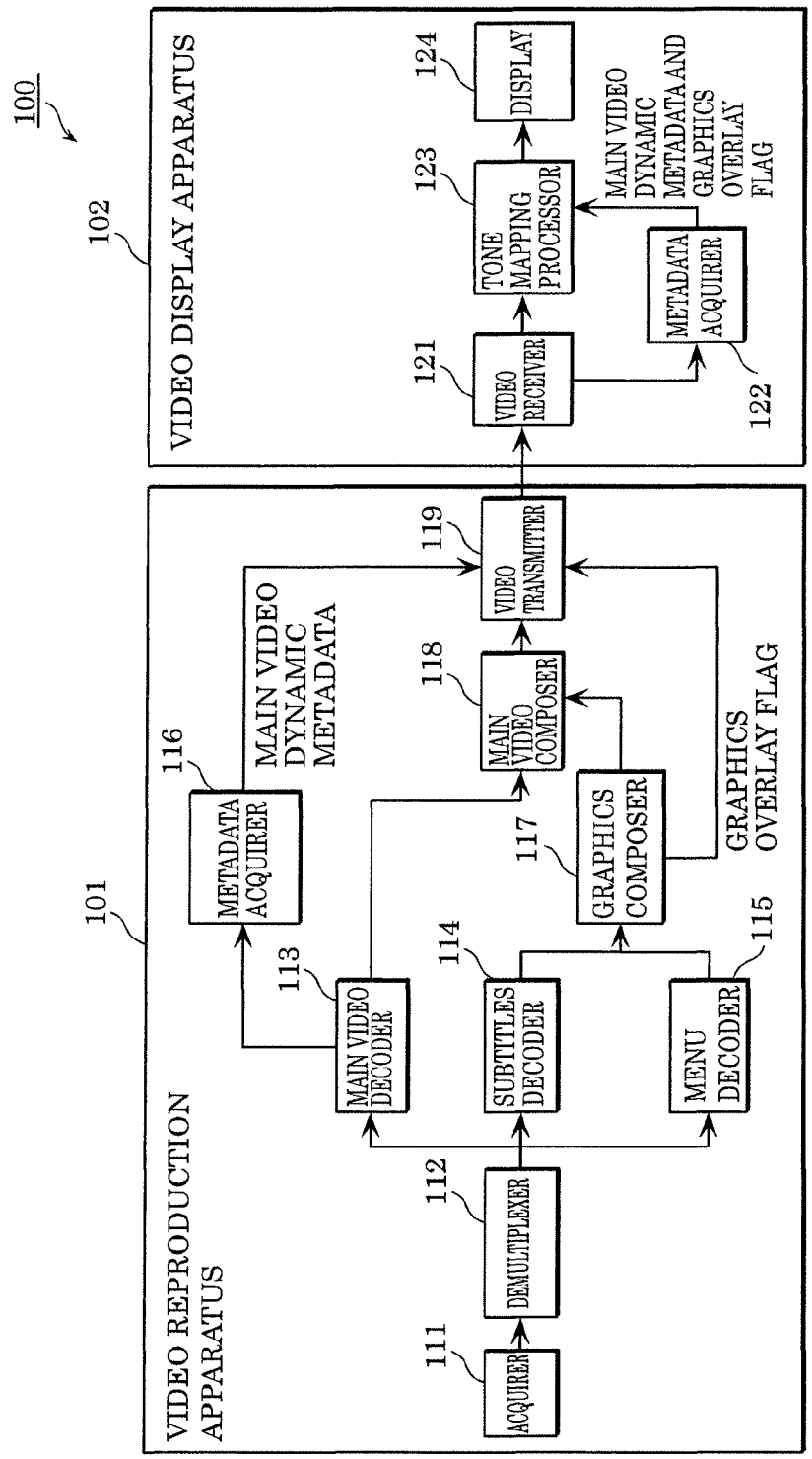
FIG. 7 is a block diagram of a video display system according to Embodiment 1.

FIG. 7 is a block diagram showing a configuration of video display system 100 according to the present embodiment. Video display system 100 shown in FIG. 7 includes video reproduction apparatus 101 and video display apparatus 102.

Video reproduction apparatus 101 reproduces a video, and outputs the obtained video to video display apparatus 102. Video reproduction apparatus 101 includes acquirer 111, demultiplexer 112, main video decoder 113, subtitles decoder 114, menu decoder 115, metadata acquirer 116, graphics composer 117, main video composer 118, and video transmitter 119.

Acquirer 111 acquires a video signal. For example, in the case where video reproduction apparatus 101 is a disc reproduction apparatus, acquirer 111 acquires a video signal by reproducing a disc. In the case where video reproduction apparatus 101 is a broadcast reception apparatus, acquirer 111 acquires a video signal by receiving a broadcast wave. In the case where video reproduction apparatus 101 is an internet broadcast reception apparatus, acquirer 111 acquires a video signal by receiving an internet broadcast.

Demultiplexer 112 outputs a main video signal, a subtitles signal, and a menu signal that have been encoded and included in the video signal to main video decoder 113, subtitles decoder 114, and menu decoder 115, respectively.

Main video decoder 113 decodes the encoded main video signal output from demultiplexer 112.

Subtitles decoder 114 decodes the encoded subtitles signal output from demultiplexer 112. Also, subtitles decoder 114 determines whether or not to display subtitles based on a user's operation or the like, and selects the type of subtitles to be displayed. Subtitles decoder 114 outputs the selected subtitles to graphics composer 117 when displaying the subtitles.

Menu decoder 115 decodes the encoded menu signal output from demultiplexer 112. Also, menu decoder 115 determines whether or not to display a menu based on a user's operation or the like, and selects the type of menu to be displayed. Menu decoder 115 outputs the selected menu to graphics composer 117 when displaying the menu. Menu decoder 115 may overlay and display a menu by using, not only information from the video signal, but also a program that runs on video reproduction apparatus 101.

Metadata acquirer 116 acquires main video dynamic metadata. For example, metadata acquirer 116 generates main video dynamic data based on information included in the main video signal.

Graphics composer 117 generates graphics information by configuring subtitles and a menu. As described above, graphics composer 117 may convert the resolutions of the subtitles and the menu. For example, in the case of Ultra HD Blu-ray, graphics composer 117 converts the subtitles and the menu in HD format to UHD format.

Also, in the case where graphics composer 117 generates graphics information and overlays the generated graphics information on the main video, graphics composer 117 sets the graphics overlay flag to ON, and transmits the graphics overlay flag to video transmitter 119. In the case where graphics composer 117 does not overlay the graphics information on the main video, graphics composer 117 sets the graphics overlay flag to OFF, and transmits the graphics overlay flag to video transmitter 119. The graphics overlay flag may be generated by a program in video reproduction apparatus 101, or by any other means.

Main video composer 118 generates a video signal by overlaying the graphics information generated by graphics composer 117 on the main video obtained by main video decoder 113.

Video transmitter 119 transmits the video signal generated by main video composer 118 and the dynamic metadata to video display apparatus 102 via a video signal transmitting means such as an HDMI cable. The dynamic metadata includes the main video dynamic metadata acquired by metadata acquirer 116 and the graphics overlay flag generated by graphics composer 117.

FIG. 8A is a diagram showing a configuration example of the main video dynamic metadata and the graphics overlay flag transmitted from video reproduction apparatus 101 to video display apparatus 102. As shown in FIG. 8A, the main video dynamic metadata shows the maximum luminance and the average luminance of the main video. For example, the main video dynamic metadata shows the maximum luminance and the average luminance per frame or more frames.

FIG. 8B is a diagram showing another configuration example of the main video dynamic metadata and the graphics overlay flag. As shown in FIG. 8B, the graphics overlay flag may include a subtitles overlay flag that indicates whether subtitles are overlaid on the main video and a menu overlay flag that indicates whether a menu is overlaid on the main video.

Next, a configuration of video display apparatus 102 will be described. Video display apparatus 102 includes video receiver 121, metadata acquirer 122, tone mapping processor 123, and display 124.

Video receiver 121 receives the video signal and the dynamic metadata transmitted from video reproduction apparatus 101. Video receiver 121 separates the video signal from the dynamic metadata, and transmits the video signal to tone mapping processor 123 and the dynamic metadata to metadata acquirer 122. Metadata acquirer 122 transmits the main video dynamic metadata and the graphics overlay flag included in the dynamic metadata to tone mapping processor 123 as a control signal.

Tone mapping processor 123 performs a tone mapping process on the video signal in accordance with the main video dynamic metadata. Specifically, tone mapping processor 123 performs a tone mapping process (dynamic tone mapping process) on the video signal in accordance with the main video dynamic metadata in the case where the graphics overlay flag is set to OFF. On the other hand, in the case where the graphics overlay flag is set to ON, tone mapping processor 123 performs a tone mapping process with reduced influence of dynamic tone mapping on the overlaid graphics. Display 124 displays the video signal that has undergone the tone mapping process.

2-2. Tone Mapping Processor

Figure 9:
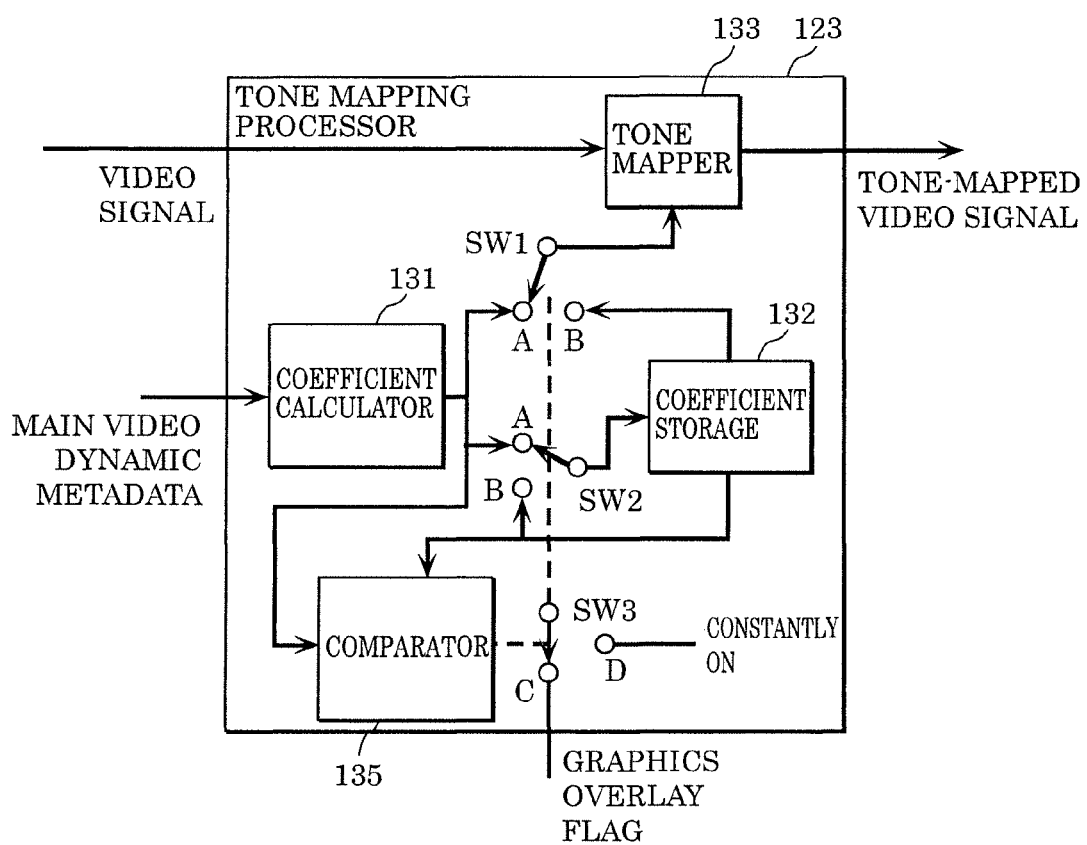
FIG. 9 is a block diagram of a tone mapping processor according to Embodiment 1.

Tone mapping processor 123 will be described in detail. FIG. 9 is a block diagram showing a configuration of tone mapping processor 123. Tone mapping processor 123 includes coefficient calculator 131, coefficient storage 132, tone mapper 133, comparator 135, and switches SW1, SW2, and SW3.

The video signal from video receiver 121 is transmitted to tone mapper 133. The main video dynamic metadata from metadata acquirer 122 is transmitted to coefficient calculator 131.

Coefficient calculator 131 calculates a tone mapping coefficient used in the tone mapping process performed by tone mapper 133 according to the video display capabilities such as the luminance of video display apparatus 102. Coefficient storage 132 stores the tone mapping coefficient calculated by coefficient calculator 131. As used herein, the tone mapping coefficient refers to a coefficient included in a function that indicates conversion characteristics used in the tone mapping process. That is, the conversion characteristics are determined based on the tone mapping coefficient.

Switch SW1 selects one from the tone mapping coefficient (A) calculated by coefficient calculator 131 and the tone mapping coefficient (B) stored in coefficient storage 132, and transmits the selected tone mapping coefficient to tone mapper 133. Switch SW2 selects one from the tone mapping coefficient (A) calculated by coefficient calculator 131 and the tone mapping coefficient (B) stored in coefficient storage 132, and inputs the selected tone mapping coefficient to coefficient storage 132. That is, switch SW2 switches between (A) updating the tone mapping coefficient stored in coefficient storage 132 with the tone mapping coefficient newly calculated by coefficient calculator 131 and (B) continuously storing the currently stored tone mapping coefficient.

Switches SW1 and SW2 work in conjunction with each other, and undergo switching according to an output signal of switch SW3. In the case where the output signal of switch SW3 is set to OFF, switches SW1 and SW2 are both connected to A. In the case where the output signal of switch SW3 is set to ON, switches SW1 and SW2 are both connected to B. Switch SW3 switches between (C) outputting the graphics overlay flag and (D) outputting a signal that is constantly set to ON according to an output signal of comparator 135.

Comparator 135 compares the tone mapping coefficient that varies dynamically according to the main video and was calculated by coefficient calculator 131 from the main video dynamic metadata and the tone mapping coefficient when the graphics overlay flag stored in coefficient storage 132 was set to ON, and then controls switch SW3 based on the result of comparison.

In the initial state, the graphics overlay flag is set to OFF, and two tone mapping coefficients that are input to comparator 135 are the same. Accordingly, the output signal of comparator 135 is set to ON, and switch SW3 is connected to (C).

When the graphics overlay flag is set to ON, coefficient storage 132 stores the tone mapping coefficient when the graphics overlay flag was changed to ON. As a result, the two tone mapping coefficients input to comparator 135 take different values, and thus the output signal of comparator 135 is set to OFF, and switch SW3 is connected to (D).

When the tone mapping coefficient output from coefficient calculator 131 equals the tone mapping coefficient stored in coefficient storage 132, the output signal of comparator 135 is set to ON. As a result, switch SW3 is connected to (C), and switches SW1 and SW2 are controlled according to the state of the graphics overlay flag. That is, in the case where the graphics overlay flag is set to OFF, switches SW1 and SW2 are connected to (A), and the tone mapping coefficient that is dynamically calculated by coefficient calculator 131 is transmitted to tone mapper 133. As a result, normal dynamic tone mapping is executed.

Also, in the case where the graphics overlay flag includes a subtitles overlay flag and a menu overlay flag, the processing of the tone mapping coefficient input to tone mapper 133 may be changed according to the combination. As an example, in the case where the graphics overlay flag is set to ON, the tone mapping coefficient is fixed (switches SW1 and SW2 are connected to B). When only the menu overlay flag is set to ON, a normal tone mapping coefficient is used (switches SW1 and SW2 are connected to A).

The configuration described here is merely an example, and thus tone mapping processor 123 may be configured to, in the case where the graphics overlay flag is set to ON, fix the tone mapping coefficient at a specific luminance or less, or not perform the tone mapping process.

Figure 10:
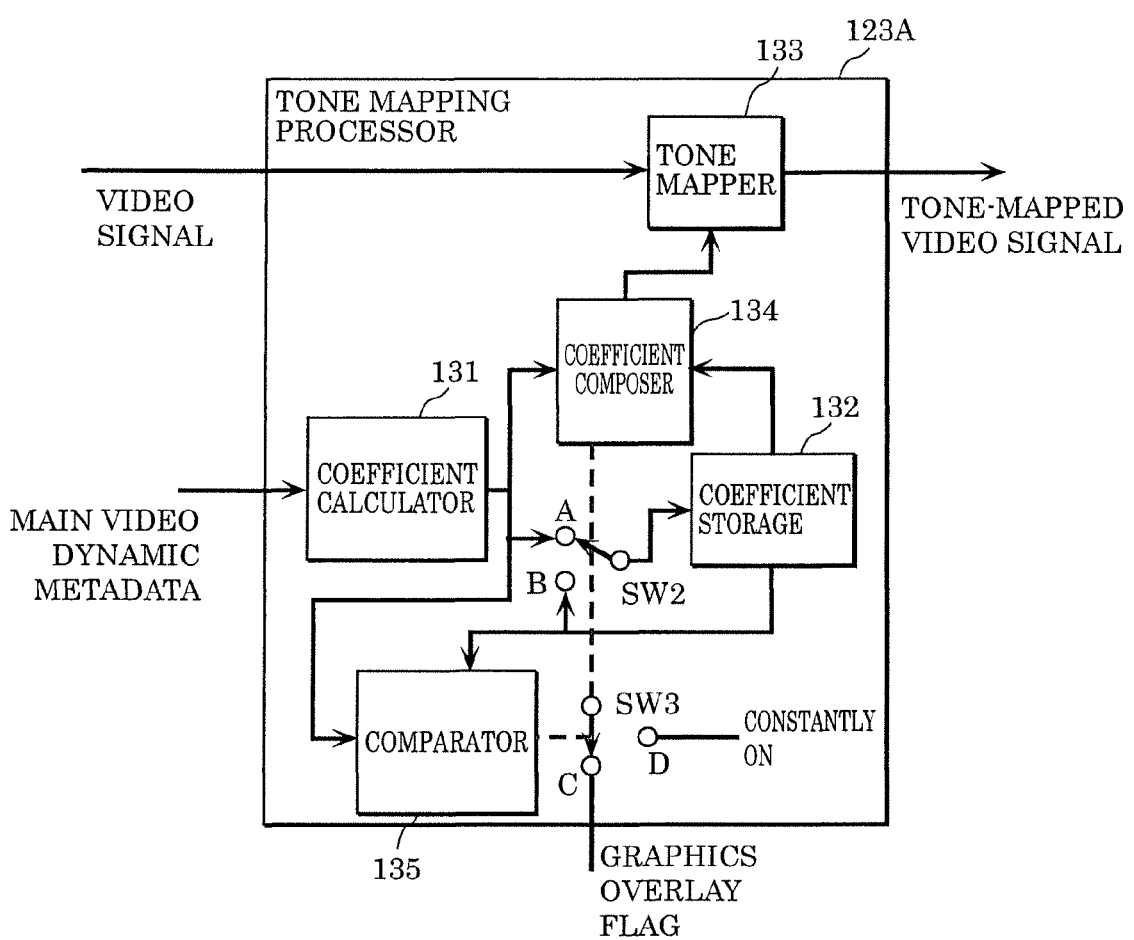
FIG. 10 is a block diagram of a tone mapping processor according to a variation of Embodiment 1.

FIG. 10 is a diagram showing a configuration of tone mapping processor 123A that is configured to fix the tone mapping coefficient at a specific luminance or less. Tone mapping processor 123A includes coefficient composer 134 in place of switch SW1.

Coefficient composer 134 performs a dynamic tone mapping process on a luminance greater than or equal to a border luminance level that is a predetermined luminance when the output signal of switch SW3 is set to ON, or in other words, either when switch SW3 is connected to (D) or when the graphics overlay flag is set to ON. However, coefficient composer 134 performs the following processing on a luminance less than the border luminance level: (1) fixing the tone mapping; (2) not performing a tone mapping process; (3) suppressing variation of tone mapping; or (4) making the influence of tone mapping imperceptible to human. As used herein, the border luminance level refers to, for example, a luminance higher than the maximum luminance value used in the graphics. With this configuration, the variation of tone mapping in the luminance range used in the graphics is suppressed. Also, in the processing described above, in order to maintain continuity between the conversion characteristics greater than or equal to the border luminance level and the conversion characteristics less than the border luminance level, coefficient composer 134 may correct the conversion characteristics in these border regions such that the conversion characteristics varies smoothly.

Here, the configuration has been described using only a video, subtitles, and a menu, but video reproduction apparatus 101 and video display apparatus 102 are configured to also process, transmit, and output an audio signal and the like. These are irrelevant to the present disclosure, and thus a description thereof is omitted here and in the following description.

Also, in the case where the graphics overlay flag includes a subtitles overlay flag and a menu overlay flag, coefficient composer 134 shown in FIG. 10 uses different overlay methods depending on the state of the subtitles overlay flag and the menu overlay flag. For example, coefficient composer 134 sets the border luminance level to different values between when the graphics overlay flag is set to ON and when only the menu overlay flag is set to ON.

Coefficient composer 134 sets the border luminance level by taking into consideration the highest luminance of display 124 and other video-related characteristics. In general, the luminance level of a menu is higher than the luminance level of subtitles. Accordingly, in the case where the menu overlay flag is set to ON, coefficient composer 134 sets the border luminance level to be higher than that in the case where only the subtitles overlay flag is set to ON.

Whether to overlay a menu is determined by a user, and thus importance may be placed on tone mapping of the main video rather than the influence of dynamic tone mapping on the menu. Accordingly, in the case where the menu overlay flag is set to ON, coefficient composer 134 may set the border luminance level to be lower than that in the case where the graphics overlay flag is set to ON.

Comparator 135 uses any one of the following methods as a method for comparing two tone mapping coefficients. For example, comparator 135 determines whether two tone mapping coefficients match completely or whether two tone mapping coefficients are within a pre-set error range. This is effective when the value range of the tone mapping coefficients is small. FIG. 11A is a diagram showing a determination method in which it is determined that tone mapping coefficients match if the values of the tone mapping coefficients are within a predetermined error range. In FIG. 11A, n is the number of values that constitute a tone mapping coefficient, T0$i$ is the tone mapping coefficient calculated based on the main video dynamic metadata, T1$i$ is the tone mapping coefficient stored in coefficient storage 132, and Di is a predetermined error for each value. Also, output "YES" and output "NO" indicate processing of setting the output signal of comparator 135 to "YES" or "NO".

According to another method, comparator 135 classifies, instead of comparing directly, individual values constituting the tone mapping coefficient into groups according to the luminance information, makes evaluations, and performs comparison while acknowledging errors. For example, comparator 135 classifies tone mapping coefficients into highest luminance, intermediate luminance, low luminance, and the like, makes evaluations by providing an evaluation function for each coefficient, and compares the results.

Alternatively, instead of comparing errors, comparator 135 divides a coordinate space that uses the grouped values into regions based on predetermined values, and then determines that the coefficients match if they belong to the same region and determines that the coefficients do not match if they belong to different regions. FIG. 11B is a diagram showing an example of determination made in this case.

Alternatively, comparator 135 may determine that the coefficients match if they belong to the same region or proximity, and otherwise determine that the coefficients do not match. FIG. 11C is a diagram showing an example of determination made in this case.

In FIGS. 11B and 11C, the coordinate space is represented as a two dimensional space, but the dimension may be higher than that.

2-3. Operations of Video Display System

Figure 12:
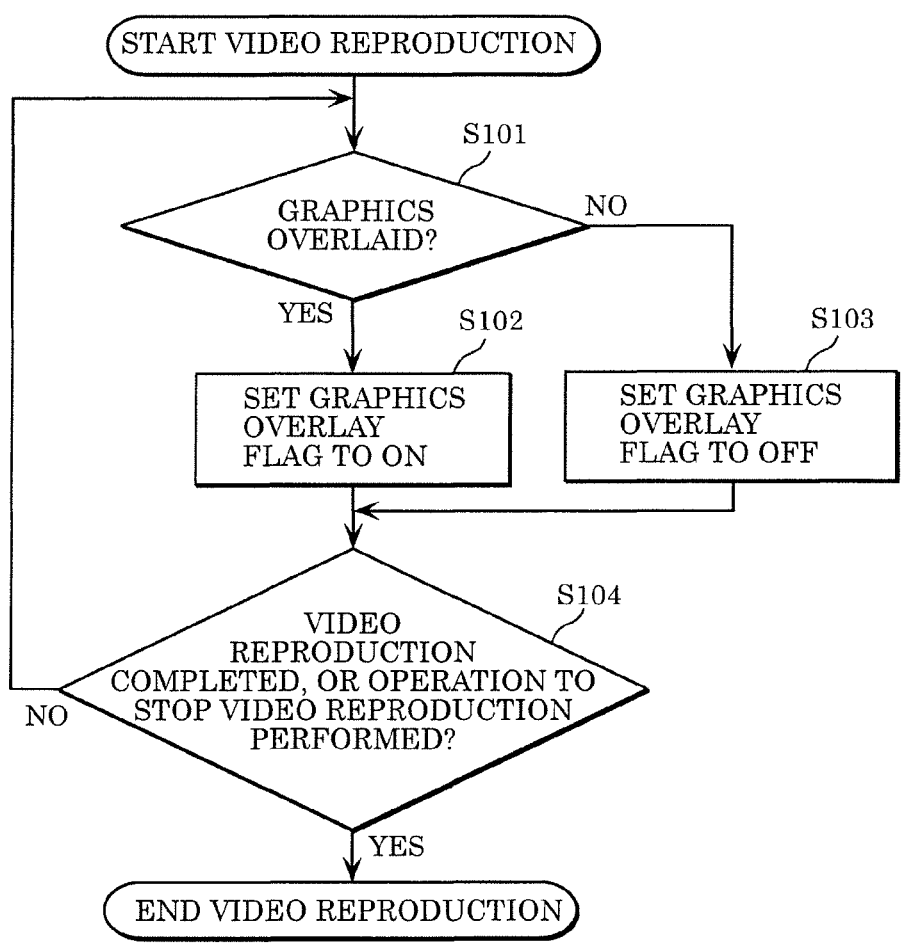
FIG. 12 is a flowchart illustrating the processing of a video reproduction apparatus according to Embodiment 1.

A flow of operations performed in the video display system will be described. FIG. 12 is a flowchart illustrating the operations of video reproduction apparatus 101. After the reproduction of a video starts, video reproduction apparatus 101 determines, based on the graphics (subtitles and a menu) processing state, whether graphics are overlaid on the main video (S101). If it is determined that graphics are overlaid on the main video (Yes in S101), video reproduction apparatus 101 sets the graphics overlay flag to ON (S102). If, on the other hand, it is determined that graphics are not overlaid on the main video (No in S101), video reproduction apparatus 101 sets the graphics overlay flag to OFF (S103). Then, video reproduction apparatus 101 repeatedly performs the processing operations of steps S101 to S103 until the reproduction of the video is completed or an operation to stop the reproduction of the video is performed (S104). For example, the processing operations are repeatedly performed for each frame or every plurality of frames.

Figure 13:
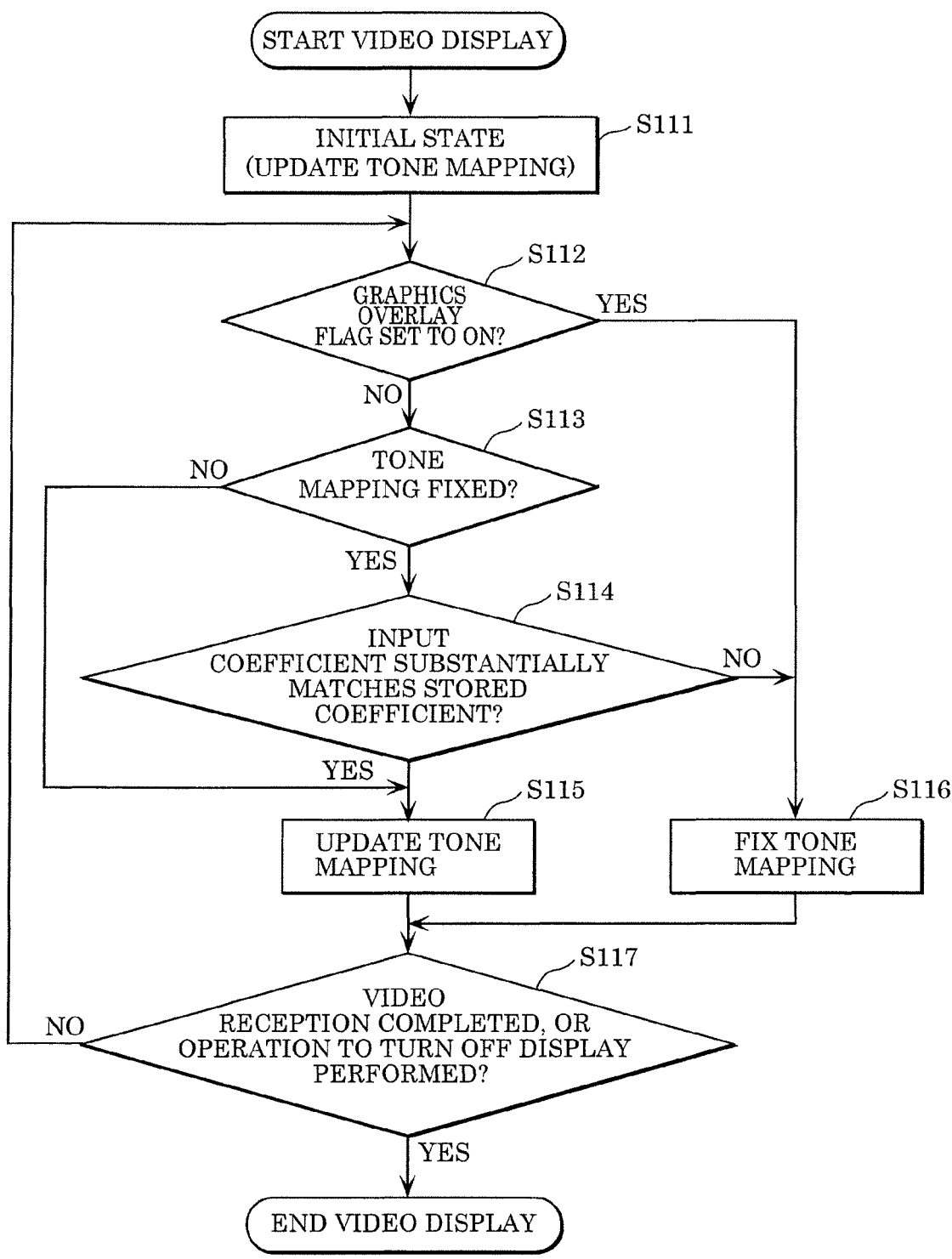
FIG. 13 is a flowchart illustrating the processing of a video display apparatus according to Embodiment 1.

FIG. 13 is a flowchart illustrating the operations of video display apparatus 102. When the display of the video starts, first, in the initial state, dynamic tone mapping for which tone mapping is updated is selected (S111). Specifically, switch SW3 is connected to C, and switches SW1 and SW2 are connected to A.

In this state, the output signal of switch SW3 is set based on the state of the graphics overlay flag. That is, in a state in which the graphics overlay flag is set to OFF (No in S112 and No in S113), the dynamic tone mapping continues (S115). Also, at this time, the tone mapping coefficient that varies is stored in coefficient storage 132.

On the other hand, when the graphics overlay flag is set to ON (Yes in S112), video display apparatus 102 fixes tone mapping (S116). Specifically, the output signal of switch SW3 is set to ON. As a result, switches SW1 and SW2 are connected to B, and the output signal of coefficient storage 132 is input to coefficient storage 132. Accordingly, the tone mapping coefficient immediately before switch SW2 is switched from A to B is stored in coefficient storage 132. Also, switch SW1 is connected to B, and thus the tone mapping coefficient input to tone mapper 133 is fixed. Accordingly, the variation of tone mapping with time is eliminated. At this time, the two tone mapping coefficients that are input to comparator 135 are normally different, and thus switch SW3 is connected to D, and the output signal of switch SW3 is constantly set to ON.

Once tone mapping is fixed, the fixed tone mapping is unchanged even when the graphics overlay flag is set to OFF (No in S112 and Yes in S113) unless the condition of step S114 is satisfied (S116). That is, in the case where the graphics overlay flag is set to OFF (No in S112 and Yes in S113), and the tone mapping coefficient calculated based on the main video dynamic metadata matches the tone mapping coefficient stored in coefficient storage 132, or in other words, the tone mapping coefficient when the graphics overlay flag was first set to ON under a predetermined condition (Yes in S114), the fixed tone mapping is released, and transition is made to dynamic tone mapping (S115).

Specifically, the output signal of comparator 135 is set to ON, switch SW3 is connected to C, and the state of the graphics overlay flag determines the state of switches SW1 and SW2. Here, when the graphics overlay flag is set to OFF, switches SW1 and SW2 are connected to A, and dynamic tone mapping using the tone mapping coefficient calculated based on the dynamic metadata of the main video is executed.

The series of processing operations are repeatedly performed until the reception of the video is completed or an operation to set the display to OFF is performed (S117). For example, the processing operations are repeatedly performed for each frame or every plurality of frames.

As described above, video display system 100 according to the present embodiment includes tone mapping processor 123 that performs a tone mapping process of converting the luminance of a video by using conversion characteristics according to the maximum luminance of the video and display 124 that displays the video that has undergone the tone mapping process. Tone mapping processor 123 switches between a first tone mapping process of dynamically changing the conversion characteristics according to the time-depend change in the maximum luminance of the video (S112) and a second tone mapping process that is performed using constant conversion characteristics irrespective of the time-depend change in the maximum luminance of the video (S113).

With this configuration, the processing can be switched according to, for example, the type of video or the like between dynamically changing the conversion characteristics for use in tone mapping and fixing the same. Accordingly, by either performing optimal tone mapping at each point in time or fixing tone mapping according to the type of video or the like, switching can be performed between suppressing and not suppressing the variation in the luminance of the video that essentially needs to be constant. In this way, video display system 100 can improve the quality of a video displayed.

Also, video display system 100 further includes a composer (main video composer 118 and graphics composer 117) that overlays graphics on the main video to generate the final output video. If graphics are not overlaid on the main video (No in S112), tone mapping processor 123 performs the first tone mapping process (S115). If graphics are overlaid on the main video (Yes in S112), tone mapping processor 123 performs the second tone mapping process (S116). With this configuration, the variation in the luminance of the graphics can be suppressed.

Also, the composer generates a first flag (graphics overlay flag) that indicates whether or not graphics are overlaid on the main video. Tone mapping processor 123 determines, according to the first flag, which of the first tone mapping process and the second tone mapping process is to be performed.

Also, graphics include subtitles and a menu, and the first flag includes a second flag (subtitles overlay flag) that indicates whether or not subtitles are overlaid on the main video and a third flag (menu overlay flag) that indicates whether or not a menu is overlaid on the main video. With this configuration, it is possible to perform a tone mapping process suitable for each of the cases where subtitles are overlaid and where a menu is overlaid.

For example, when switching from the first tone mapping process to the second tone mapping process, tone mapping processor 123 continuously uses the conversion characteristics used immediately before the switching in the second tone mapping process. With this configuration, it is possible to suppress a significant variation in the luminance when switching is performed from the first tone mapping process to the second tone mapping process.

For example, as shown in FIG. 10, in the second tone mapping process, with respect to a luminance greater than or equal to the border luminance level, tone mapping processor 123A dynamically changes the conversion characteristics according to the time-depend change in the maximum luminance of the video. With respect to a luminance less than the border luminance level, tone mapping processor 123A uses constant conversion characteristics irrespective of the time-depend change in the maximum luminance of the video.

With this configuration, with respect to a luminance greater than or equal to the border luminance level, optimal tone mapping can be performed at each point in time, and at the same time, with respect to a luminance less than the border luminance level, it is possible to suppress the luminance variation.

Also, in a state in which the second tone mapping process is performed, if the constant conversion characteristics used in the second tone mapping process and the dynamically changing conversion characteristics used in the first tone mapping process satisfy a predetermined condition, tone mapping processor 123 switches the tone mapping process that is used from the second tone mapping process to the first tone mapping process. If the condition is not satisfied, tone mapping processor 123 continues the second tone mapping process.

For example, the condition may be that the difference between the constant conversion characteristics used in the second tone mapping process and the dynamically changing conversion characteristics used in the first tone mapping process is a pre-set value or less.

For example, the conversion characteristics are classified into a plurality of categories, and the condition is that the constant conversion characteristics used in the second tone mapping process and the dynamically changing conversion characteristics used in the first tone mapping process are classified into the same category.

With this configuration, it is possible to suppress a situation in which tone mapping used is changed significantly when switching is performed from the second tone mapping process to the first tone mapping process.

Also, video display apparatus 102 according to the present embodiment includes tone mapping processor suppress the luminance variation 123 that performs a tone mapping process of converting the luminance of a video by using conversion characteristics according to the maximum luminance of the video and display 124 that displays the video that has undergone the tone mapping process. Tone mapping processor 123 switches between the first tone mapping process of dynamically changing the conversion characteristics according to the time-depend change in the maximum luminance of the video (S115) and the second tone mapping process that is performed using constant conversion characteristics irrespective of the time-depend change in the maximum luminance of the video (S116).

With this configuration, the processing can be switched according to, for example, the type of video or the like between dynamically changing the conversion characteristics for use in tone mapping and fixing the same. Accordingly, by either performing optimal tone mapping at each point in time or fixing tone mapping according to the type of video or the like, switching can be performed between suppressing and not suppressing the variation in the luminance of the video that essentially needs to be constant. In this way, video display apparatus 102 can improve the quality of a video displayed.

If it is determined that the video does not contain graphics (No in S112), tone mapping processor 123 performs the first tone mapping process (S115). If it is determined that the video contains graphics (Yes in S112), tone mapping processor 123 performs the second tone mapping process (S116). With this configuration, it is possible to suppress the variation in the luminance of the graphics.

Also, tone mapping processor 123 determines which of the first tone mapping process and the second tone mapping process is to be performed according to the first flag (graphics overlay flag) that indicates which of the first tone mapping process and the second tone mapping process is to be performed.

Also, the first flag includes a second flag (subtitles overlay flag) that indicates whether or not the video contains subtitles and a third flag (menu overlay flag) that indicates whether the video contains a menu. With this configuration, it is possible to perform a tone mapping process suitable for each of the cases where subtitles are overlaid and where a menu is overlaid.

3. Embodiment 2

In the present embodiment, in the case where transition is made back to dynamic tone mapping from fixed tone mapping, so as to remove a menu, the video display apparatus changes the tone mapping used to dynamic tone mapping specified when a menu is removed based on a predetermined time constant. With this configuration, the continuity of tone mapping can be achieved.

Figure 14:
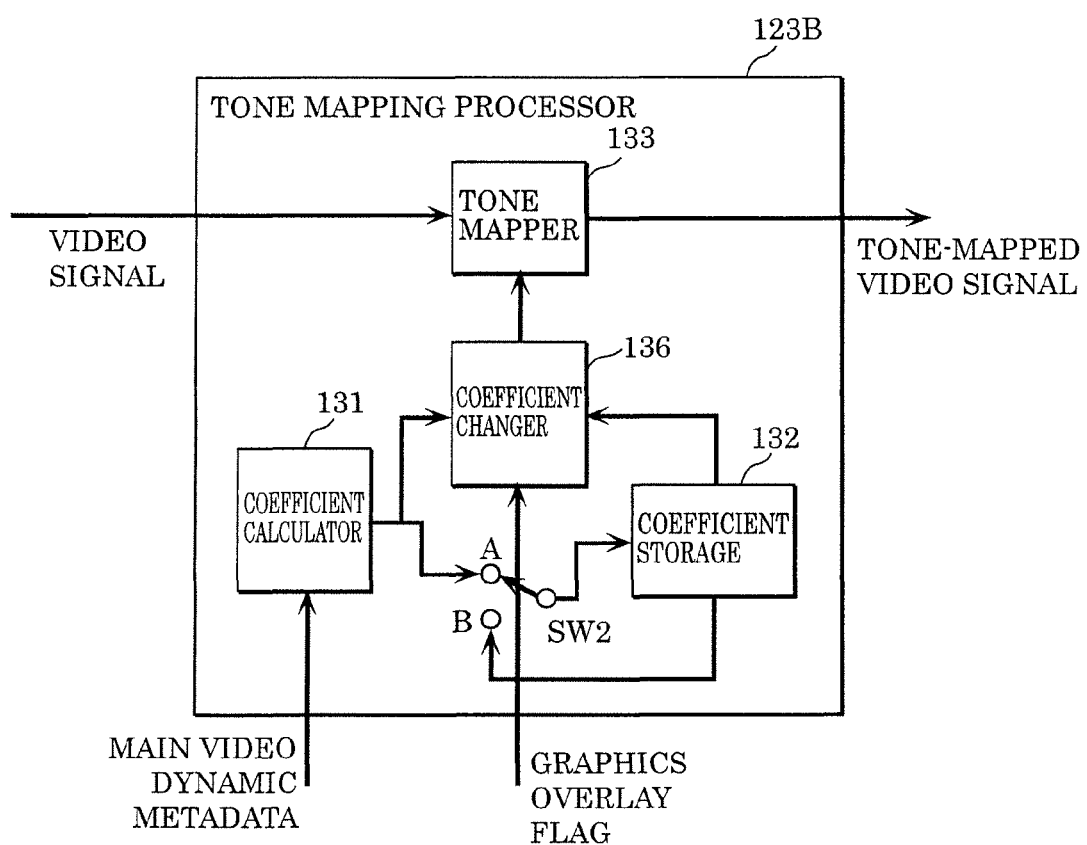
FIG. 14 is a block diagram of a tone mapping processor according to Embodiment 2.

The configuration of video reproduction apparatus 101 is the same as that of Embodiment 1, and thus a description thereof will be omitted. Also, the configuration of tone mapping processor 123B included in video display apparatus 102 is different from that of tone mapping processor 123 of Embodiment 1. FIG. 14 is a block diagram showing a configuration of tone mapping processor 123B according to the present embodiment.

Tone mapping processor 123B shown in FIG. 14 includes coefficient changer 136 in place of switch SW1. Also, tone mapping processor 123B does not include comparator 135 and switch SW3.

Figure 15:
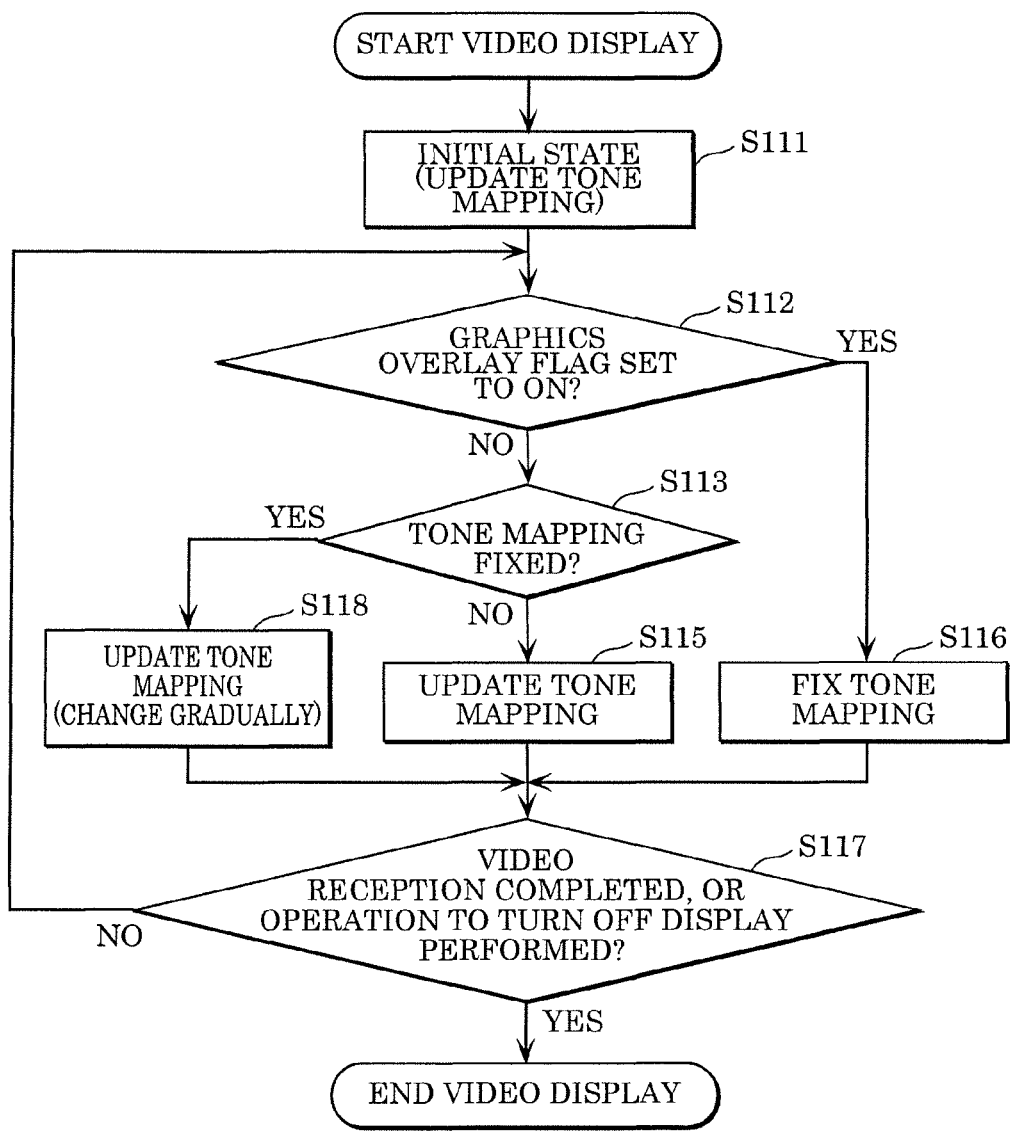
FIG. 15 is a flowchart illustrating the processing of a video display apparatus according to Embodiment 2.

FIG. 15 is a flowchart illustrating the processing of tone mapping processor 123B. The processing shown in FIG. 15 is different from the processing shown in FIG. 13 in that the processing shown in FIG. 15 includes step S118 in place of step S114.

Coefficient calculator 131 calculates a tone mapping coefficient that corresponds to the maximum luminance or the display characteristics of video display apparatus 102 by using the main video dynamic metadata. When the graphics overlay flag is set to OFF (No in S112 and No in S113), tone mapping is updated (S115). Specifically, switch SW2 is connected to A. Also, coefficient changer 136 outputs the input tone mapping coefficient directly to tone mapper 133. Tone mapper 133 performs a tone mapping process on the input video signal by using the tone mapping coefficient. As a result, dynamic tone mapping is implemented.

On the other hand, when the graphics overlay flag is set from OFF to ON (Yes in S112), the tone mapping is fixed (S116). Specifically, switch SW2 is connected to B, and the tone mapping coefficient used at that time is stored in coefficient storage 132. In this case, coefficient changer 136 outputs, to tone mapper 133, the tone mapping coefficient output from coefficient storage 132. Accordingly, when the graphics overlay flag is set to ON, the tone mapping coefficient is fixed, and the tone mapping of the main video is fixed.

Here, when the graphics overlay flag is set from ON to OFF (No in S112 and Yes in S113), coefficient changer 136 outputs the tone mapping coefficient output from coefficient calculator 131 so that dynamic tone mapping is performed. At this time, coefficient changer 136 gradually changes the tone mapping coefficient, instead of immediately switching the fixed tone mapping coefficient to the dynamically changing tone mapping coefficient (S118).

As used herein, to "gradually change the tone mapping coefficient" means that the tone mapping coefficient is changed gradually or stepwise during a pre-set period. That is, in the above-described period, the tone mapping coefficient is changed from coefficient B to coefficient A via a value of 1 or more between the tone mapping coefficient output from coefficient storage 132 (hereinafter referred to as coefficient B) and the tone mapping coefficient output from coefficient calculator 131 (hereinafter referred to as coefficient A). Also, the term "pre-set period" refers to a period during which, for example a plurality of frames are displayed. That is, a frame that has undergone a tone mapping process using coefficient B, one or more frames that have undergone a tone mapping process using a tone mapping coefficient between coefficient B and coefficient A, and a frame that has undergone a tone mapping process using coefficient A are sequentially output.

Figure 16:
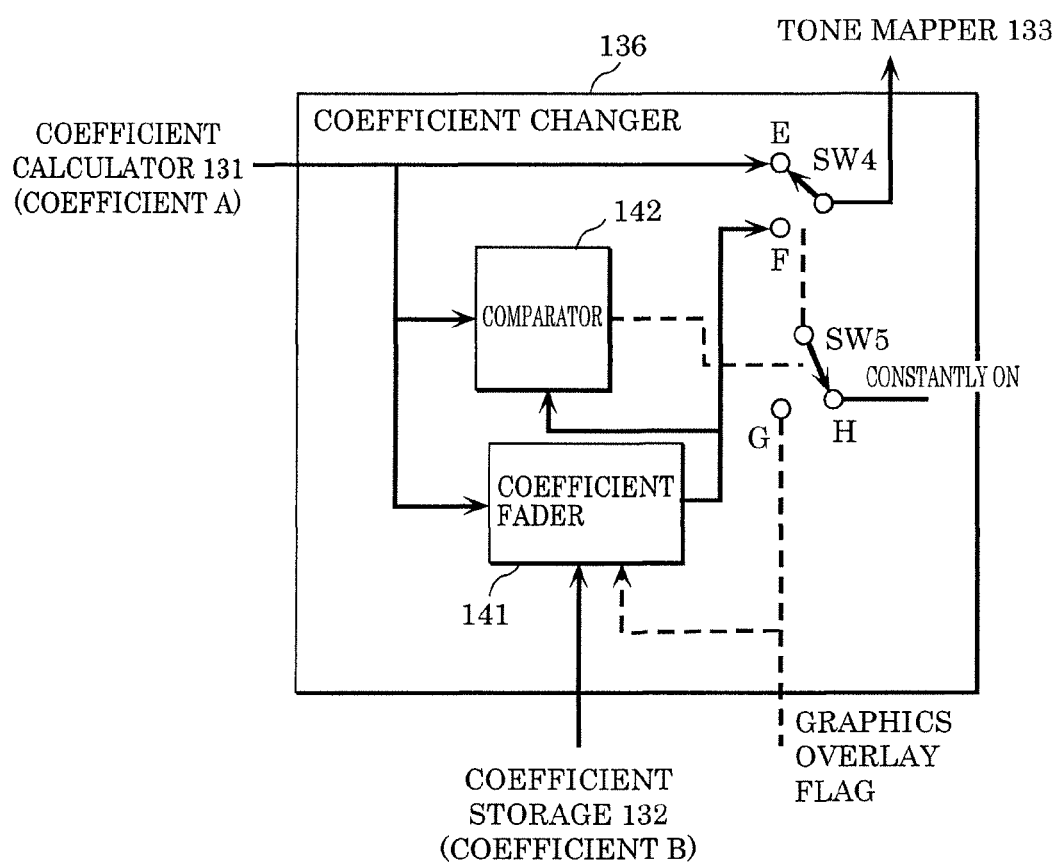
FIG. 16 is a block diagram of a coefficient changer according to Embodiment 2.

FIG. 16 is a block diagram showing a configuration of coefficient changer 136. Coefficient changer 136 includes coefficient fader 141, comparator 142, and switches SW4 and SW5.

The tone mapping coefficient (coefficient A) output from coefficient calculator 131 is input to E of switch SW4, comparator 142, and coefficient fader 141. The tone mapping coefficient (coefficient B) output from coefficient storage 132 is input to coefficient fader 141. The graphics overlay flag is used to control coefficient fader 141, and input to G of switch SW5. The output signal of coefficient fader 141 is input to comparator 142 and F of switch SW4. The output signal of comparator 142 controls switch SW5. A signal that is constantly set to ON is input to H of switch SW5. Switch SW4 is controlled by the output signal of switch SW5. The output signal of switch SW4 is the tone mapping coefficient that has been changed, and is transmitted to tone mapper 133.

Hereinafter, the operations of coefficient changer 136 shown in FIG. 16 will be described. In the initial state, two coefficients, namely, coefficient A and coefficient B to be input are the same, and the graphics overlay flag is set to OFF. Accordingly, the output signal of coefficient fader 141 is also a tone mapping coefficient that is the same as coefficient A. Also, the output signal of comparator 142 is set to ON, and switch SW5 is connected to G. As a result, the output signal of switch SW5 is set to OFF, switch SW4 is connected to E, and coefficient A is output directly to tone mapper 133.

In this state, when the graphics overlay flag is set to ON, coefficient A is dynamically changed according to the main video, and the value of coefficient A when the graphics overlay flag was set to ON is stored as coefficient B. Coefficient fader 141 directly outputs coefficient B when the graphics overlay flag is set to ON, and performs fading processing by using a predetermined time constant so as to change the coefficient from coefficient B to coefficient A that is appropriate at that time when the graphics overlay flag is changed from ON to OFF. When the graphics overlay flag is changed to ON, because coefficient A and coefficient B that are input to comparator 142 are different, comparator 142 outputs OFF, and switch SW5 is connected to H. As a result, the output signal of switch SW5 is constantly set to ON, and switch SW4 is connected to F. That is, the tone mapping coefficient output from coefficient fader 141 is output to tone mapper 133.

Here, when the graphics overlay flag is set to OFF, coefficient fader 141 starts fading processing by using a predetermined time constant, and thus the tone mapping coefficient output from coefficient fader 141 gradually approaches coefficient A from coefficient B.

Comparator 142 compares the tone mapping coefficient output from coefficient fader 141 with coefficient A. If it is determined that they are the same, comparator 142 sets the output signal to OFF. For example, as in the methods shown in FIGS. 11A to 11C, comparator 142 determines whether or not two coefficients match each other by using a predetermined error, or a predetermined criterion.

As a result, switch SW5 is connected to G. Accordingly, the output signal of switch SW5 takes the same value as that of the graphics overlay flag, or in other words, OFF, and thus switch SW4 is connected to E. As a result, as in the initial state, coefficient A is output directly to tone mapper 133. That is, a tone mapping coefficient corresponding to the main video dynamic metadata is output.

Through the processing described above, when the graphics overlay flag is set to ON, dynamic tone mapping is fixed, and when the graphics overlay flag is set to OFF, the tone mapping coefficient used is smoothly switched to the tone mapping coefficient that varies corresponding to the main video dynamic metadata.

Also, in the case where the graphics overlay flag includes, not only information that indicates ON or OFF, but also information regarding the border luminance of tone mapping, video display apparatus 102 may include a coefficient composer. The coefficient composer composes the output signal of switch SW4 with the tone mapping coefficient output from coefficient calculator 131 shown FIG. 16 such that dynamic tone mapping is continued at a luminance greater than or equal to the border luminance level, and tone mapping is fixed at a luminance less than the border luminance level.

As described above, in video display system 100 according to the present embodiment, tone mapping processor 123B switches between the first tone mapping process of dynamically changing the conversion characteristics according to the time-depend change in the maximum luminance of the video and the second tone mapping process that is performed using constant conversion characteristics irrespective of the time-depend change in the maximum luminance of the video. When the tone mapping process used is switched from the second tone mapping process to the first tone mapping process, the conversion characteristics used is changed gradually or stepwise from the constant conversion characteristics to dynamically changing conversion characteristics over a plurality of frames (S118).

With this configuration, it is possible to suppress a situation in which tone mapping used is changed significantly when switching is performed from the second tone mapping process to the first tone mapping process.

4. Embodiment 3

Also, in the method in which tone mapping is fixed by transmitting the subtitles overlay flag to the video display apparatus so as to display subtitles, the following problem arises. Subtitles are displayed for each dialogue, and thus a subtitles displayed state in which subtitles are displayed and a subtitles non-displayed state in which subtitles are not displayed are alternately repeated in a very short period of time. Accordingly, with the method in which tone mapping is fixed only in the period during which subtitles are displayed, a second problem arises in that it is difficult to perform processing. In the present embodiment, the second problem is solved by using any one of the following methods.

(1) The video display apparatus fixes tone mapping when the display of subtitles is set to ON irrespective of individual subtitles display state.

(2) Apart from individual subtitles, a subtitles non-display period and a subtitles display period that have a predetermined length of time are defined, and the video display apparatus performs dynamic tone mapping during the non-display period, and fixes tone mapping during the display period.

Furthermore, in the case where the video display apparatus controls dynamic tone mapping according to ON/OFF of the display of subtitles, when transition is made back to dynamic tone mapping from fixed tone mapping by setting the display of subtitles effectively to OFF, the video display apparatus resumes normal dynamic tone mapping without causing a sense of discomfort by performing a method similar to that of Embodiment 1 or 2.

The overall configuration of video display system 100 according to the present embodiment is the same as that shown in FIG. 7. Accordingly, a detailed description thereof is omitted here. Video reproduction apparatus 101 divides the graphics overlay flag into two, and transmits a menu overlay flag and a subtitles overlay flag to video display apparatus 102. Alternatively, video reproduction apparatus 101 transmits maximum menu luminance information (MAXGLL) and maximum subtitles luminance information (MAXSLL) to video display apparatus 102 as the graphics overlay flag. Accordingly, video display apparatus 102 can perform appropriate tone mapping.

FIG. 17A is a diagram showing a configuration example of the main video dynamic metadata, the graphics overlay flag, and the graphics luminance information. Also, FIG. 17B is a diagram showing another configuration example of the main video dynamic metadata and the graphics luminance information. Here, an example will be shown in which subtitles metadata and menu metadata are provided.

In the example shown in FIG. 17A, a subtitles overlay flag and a menu overlay flag are independently provided. Also, the graphics luminance information includes maximum subtitles luminance information (MAXSLL) that indicates the maximum luminance of subtitles and maximum menu luminance information (MAXGLL) that indicates the maximum luminance of a menu.

In the example shown in FIG. 17B, specific values of MAXSLL and MAXGLL are used as information that indicates that subtitles or a menu is not overlaid. Specifically, each of MAXSLL and MAXGLL is 8 bit. In MAXSLL, a value of 0 indicates that subtitles are not present, a value of 255 indicates that subtitles are present, but the luminance is not known, and other values indicate that subtitles are present and also indicate a brightness level of the subtitles of 2 nits to 510 nits with an increment of 2 nits. In MAXGLL, a value of 0 indicates that a menu is not present, and a value of 255 indicates that a menu is present, but the luminance is not known, and other values indicate that a menu is present and also indicate a brightness level of the menu of 4 nits to 1020 nits with an increment of 4 nits. Here, as the luminance relationship between the values of MAXSLL and the values of MAXSLL, an example is shown in which an increment of 2 nits is used in MAXSLL, and an increment of 4 nits is used in MAXGLL, but the increment may be set to an appropriate value depending on the system.

Hereinafter, the operations of video display system 100 according to the present embodiment will be described. With respect to a menu, video reproduction apparatus 101 sets the menu overlay flag to ON only when a menu is displayed. On the other hand, with respect to subtitles, because subtitles are frequently displayed in synchronization with the main video, if control is performed so as to set the subtitles overlay flag to ON only when subtitles are overlaid, as with the menu, video display apparatus 102 frequently needs to switch tone mapping. Accordingly, in the present embodiment, the following operations are performed on subtitles.

Subtitles are defined in reproduction control information (playlist in the case of a Blu-ray disc) when the main video is reproduced, and subtitles are enabled in the settings of video reproduction apparatus 101. Furthermore, when the display of subtitles is set to ON with a reproduction control command, video reproduction apparatus 101 starts reproduction of the main video, and also sets the subtitles overlay flag to ON, and fixes MAXSLL. This continues until the reproduction based on the reproduction control information ends, or until subtitles are disabled in the settings of video reproduction apparatus 101, or until the display of subtitles is terminated with a reproduction control command. In the case where, in MAXSLL, the luminance is undetermined or not defined, the subtitles display period and the tone mapping are fixed.

Figure 18A:
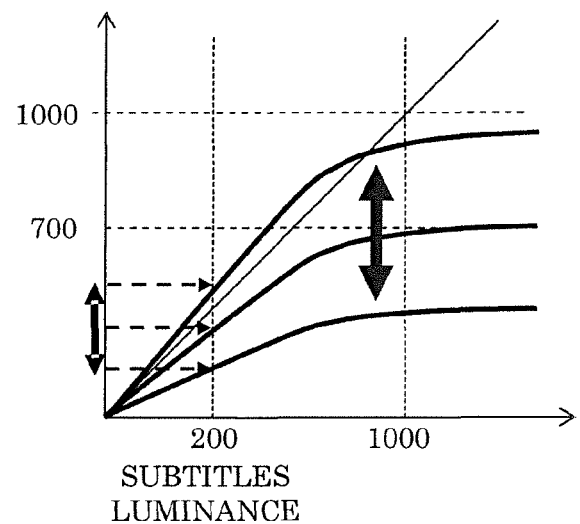
FIG. 18A is a diagram showing a luminance variation in conventional tone mapping.
Figure 18B:
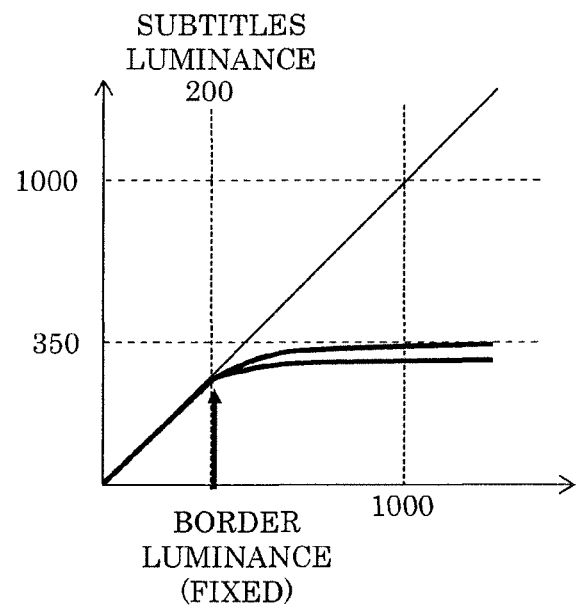
FIG. 18B is a diagram showing a luminance variation in tone mapping according to an embodiment.

FIG. 18A is a diagram showing an example of tone mapping in the case where MAXSLL is not set (conventional example). FIG. 18B is a diagram showing an example of tone mapping in the case where MAXSLL is set. As shown in FIG. 18B, tone mapping is not performed in a region below the luminance (200 nits) set by MAXSLL, and thus subtitles can be displayed in a stable manner.

On the other hand, there is a disadvantage in that, in the case where control as described above is performed, when subtitles are not displayed for a substantially long period of time, advantageous effects of dynamic tone mapping cannot be obtained sufficiently. Accordingly, video reproduction apparatus 101 sets the subtitles overlay flag to OFF during a period in which subtitles are not displayed for a predetermined length of time or longer. As a result, advantageous effects of dynamic tone mapping can be obtained more reliably. The subtitles non-display period during which the subtitles overlay flag is set to OFF is defined when subtitles are created, and recorded as the subtitles overlay flag or MAXSLL together with the subtitles data.

As described above, the first flag (for example, the subtitles overlay flag or MAXSLL) indicates a subtitles display period, which is a time period during which subtitles are intermittently displayed, and a subtitles non-display period during which subtitles are not displayed for a predetermined length of time or longer. The tone mapping processor performs the second tone mapping process (for example, fixes tone mapping) during the subtitles display period, and performs the first tone mapping process (for example, performs dynamic tone mapping) during the subtitles non-display period. With this configuration, it is possible to suppress a situation in which tone mapping is switched frequently.

5. Embodiment 4

In the present embodiment, an example will be described in which the video reproduction apparatus is a video reproduction apparatus for reproducing Ultra HD Blu-ray discs. In the case of Blu-ray discs, there are Blu-ray discs that use BD-J (Blu-ray Disc Java®) menus and those that use HDMV (High Definition Movie Mode) menus. Accordingly, embodiments of respective cases will be described below.

Figure 19:
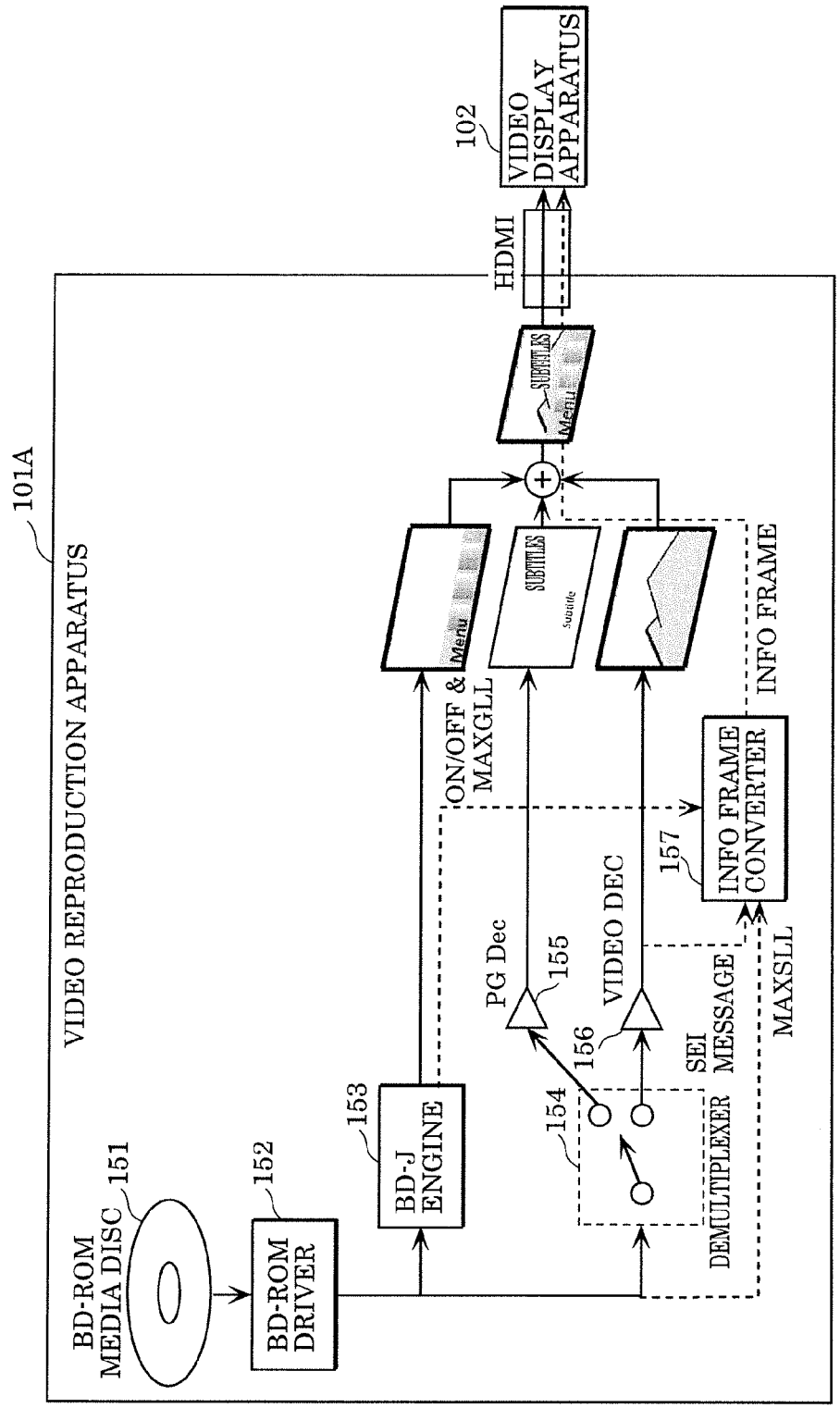
FIG. 19 is a block diagram of a video display system according to Embodiment 4.

The configuration of video display apparatus 102 is the same as that of Embodiment 1 or 2. FIG. 19 is a diagram showing a configuration example of video reproduction apparatus 101A when BD-J is used in the menu. As shown in FIG. 19, video reproduction apparatus 101A includes BD-ROM driver 152, BD-J engine 153, demultiplexer 154, PG decoder (PG Dec) 155, video decoder (Video Dec) 156, and Info Frame converter 157.

When video reproduction apparatus 101A starts reproduction of a video from disc 151 (BD-ROM media disc), BD-J data and programs are loaded into a memory included in video reproduction apparatus 101A. BD-J engine 153 executes a Java program. In the case where the program is a main video reproduction command, a video stream is loaded from the disc in accordance with the reproduction control information (playlist) in the reproduction command, and transmitted to demultiplexer 154. Demultiplexer 154 divides the video stream into material streams, and transmits subtitles to PG decoder 155 and a main video to video decoder 156. Also, although not shown, demultiplexer 154 transmits audio to an audio decoder.

After that, the subtitles are overlaid on the main video, and the resulting video is transmitted together with the audio to video display apparatus 102 (for example, a TV set) via HDMI.

At this time, dynamic metadata is extracted from the SEI message of the main video, and transmitted to Info Frame converter 157. With respect to subtitles, the subtitles overlay flag or MAXSLL is extracted from metadata that is separately defined, and transmitted to Info Frame converter 157. Alternatively, the subtitles overlay flag or MAXSLL is written into the reproduction control information (playlist), and loaded into the memory when reproduction is started, and transmitted to Info Frame converter 157. Alternatively, the subtitles overlay flag or MAXSLL is embedded into the subtitles data, extracted from the subtitles data, and input to Info Frame converter 157.

In either case, when the display of subtitles is set to OFF, input of the subtitles overlay flag or MAXSLL to Info Frame converter 157 is terminated.

Here, in the case where a menu is displayed by the Java program, the menu overlay flag or MAXGLL is transmitted to Info Frame converter 157 by the Java program. As a result, metadata regarding the main video, the subtitles, and the menu are transmitted as Info Frame to video display apparatus 102 via HDMI together with the video and the audio.

FIG. 20 is a diagram showing a configuration example of video reproduction apparatus 101B in the case where HDMV is used in the menu. As shown in FIG. 20, video reproduction apparatus 101B has a configuration different from the configuration of video reproduction apparatus 101A in that video reproduction apparatus 101B includes IG decoder (IG Dec) 158 and BDMV command interpreter 159 in place of BD-J engine 153.

In the case of HDMV as well, when the reproduction of a video starts with an HDMV command, as in the case of BD-J, the video, the audio, and the subtitles are processed, and output to video display apparatus 102 via HDMI. When displaying a menu by a user operation or with an HDMV command, IG decoder 158 and BDMV command interpreter 159 decode IG data recorded as an IG stream, and extract a command for the graphics data and the menu to be displayed. At this time, an instruction to output the menu overlay flag or MAXGLL is written into a parameter of the command, and the menu overlay flag or MAXGLL is thereby transmitted to Info Frame converter 157. Alternatively, MAXGLL is written into IG data, and then MAXGLL is transmitted to Info Frame converter 157 directly from IG decoder 158 and BDMV command interpreter 159.

As the JAVA® program for transmitting the menu overlay flag or MAXGLL to Info Frame converter 157, the following commands are used:

(1) a command for setting the menu overlay flag to OFF;
(2) a command for setting the menu overlay flag to ON;
(3) a command for setting the menu overlay flag to a register value;
(4) a command for setting MAXGLL to a designated value; and
(5) a command for setting MAXGLL to a register value.

In the case of HDMV as well, commands similar to those listed above are used.

Also, commands similar to those listed above may be used with respect to subtitles. That is, as a JAVA program for transmitting the subtitles overlay flag or MAXSLL to Info Frame converter 157, the following commands are used:

(1) a command for setting the subtitles overlay flag to OFF;
(2) a command for setting the subtitles overlay flag to ON;
(3) a command for setting the subtitles overlay flag to a register value;
(4) a command for setting MAXSLL to a designated value; and
(5) a command for setting MAXSLL to a register value.

In this case, the video reproduction apparatus may forcibly output the value set by the command even when subtitles are not actually displayed, or may enable the command only when the subtitles overlay flag defined in the PG stream is set to ON such that the subtitles overlay flag cannot be set to OFF with the command.

The details of Blu-ray and Ultra HD Blu-ray are disclosed in, for example, Non-Patent Literature (NPL) 1.

With the configuration described above, it is possible to implement an API (application programming interface) for performing switching between the first tone mapping process (for example, performing dynamic tone mapping) and the second tone mapping process (for example, fixing tone mapping) depending on the presence or absence of graphics. Accordingly, the first tone mapping process and the second tone mapping process can be easily switched.

6. Variation

The HDR video acquired by acquirer 111 may be a video on, for example, a Blu-ray disc, a DVD, a moving image delivery site on the Internet, a broadcast, or a HDD (Hard Disk Drive).

The video reproduction apparatus described above may be an apparatus that decodes a compressed video signal transmitted from a recording medium, a broadcast, or the Internet, and transmits the decoded video signal to a video display apparatus. Examples of the video reproduction apparatus include a disc player, a disc recorder, a set top box, a television set, a personal computer, and a smartphone. Also, video display apparatus 102 may have some or all of the functions of the video reproduction apparatus. For example, among the processors included in the video reproduction apparatus, video display apparatus 102 may include the processors other than acquirer 111. Also, video receiver 121, metadata acquirer 122, and tone mapping processor 123 included in video display apparatus 102 may be incorporated in the video reproduction apparatus. Also, among the processors included in tone mapping processor 123, the video reproduction apparatus may include the processors other than tone mapper 133.

The video signal transmitting means that transmits the video signal from the video reproduction apparatus to the video display apparatus may be a means that transmits the video signal in an uncompressed state such as HDMI, DVI, or DP, or may be a means that transmits the video signal in a compressed form such as transmission via a network.

The maximum luminance information or the tone mapping information of the video display apparatus can be set in the video reproduction apparatus by a user inputting the information into the video reproduction apparatus via a remote controller or the like, or via an operating apparatus included in the video reproduction apparatus. Alternatively, the user may acquire these information via the Internet or any other means, store the acquired information in a portable storage medium, and transmit the information to the video reproduction apparatus via the portable storage medium. Alternatively, the video reproduction apparatus may be connected directly to the Internet such that the video reproduction apparatus can acquire these information from a database on a server. Furthermore, the video reproduction apparatus may display a test pattern on the video display apparatus such that these information can be acquired or stored, with the user confirming the characteristics of the video display apparatus by using the displayed test pattern.

The video reproduction apparatus may generate graphics luminance information (including subtitles luminance information and menu luminance information) by detecting the luminance of graphics (subtitles or a menu) from the data of the graphics, or may acquire the luminance of graphics created in advance during production of the video data. For example, the graphics luminance may be recorded in a disc, or may be transmitted as metadata via broadcasting or the Internet. The video reproduction apparatus reads the graphics luminance, and transmits the read graphics luminance to the video display apparatus as a portion of the dynamic metadata. Alternatively, the luminance information of graphics (subtitles or a menu) may be recorded in a database on a server that is connected to the Internet as information regarding the content to be reproduced such that the video reproduction apparatus can acquire the graphics luminance information from the database, and transmit the acquired graphics luminance information to the video display apparatus.

Up to here, the video display systems according to the embodiments of the present disclosure have been described, but the present disclosure is not limited to the embodiments.

Also, the processors included in the video display systems according to the embodiments described above are typically implemented as LSIs, which are integrated circuits. They may be individual single chips, or a part or all of them may be configured in a single chip.

Also, implementation of an integrated circuit is not limited to an LSI, and may be implemented by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

Also, in each of the embodiments described above, the structural elements may be configured using dedicated hardware, or may be implemented by executing a software program suitable for the structural elements. The structural elements may be implemented by a program executor such as a CPU or a processor reading and executing a software program recorded in a recording medium such as a hard disk or a semiconductor memory.

Also, the present disclosure may be implemented as a method executed by the video display system.

Also, the functional blocks shown in the block diagrams are merely examples. Accordingly, it is possible to implement a plurality of functional blocks as a single functional block, or divide a single functional block into a plurality of blocks. Alternatively, some functions may be transferred to other functional blocks. Also, the functions of a plurality of functional blocks that have similar functions may be processed by a single piece of hardware or software in parallel or by time division.

Also, the order in which the steps of each flowchart are performed is merely an example provided to specifically describe the present disclosure. Accordingly, the order is not limited to that described above. Also, one or more of the steps described above may be performed simultaneously with (in parallel to) other steps.

A video display system according to one or more aspects has been described by way of embodiments above, but the present disclosure is not limited to the embodiments given above. Embodiments obtained by making various modifications that can be conceived by a person having ordinary skill in the art to the above embodiments as well as embodiments implemented by any combination of the structural elements of different embodiments without departing from the gist of the present disclosure may also be encompassed within the scope of one or more aspects.

INDUSTRIAL APPLICABILITY

The present disclosure is applicable to a video display system, a video reproduction apparatus, or a video display apparatus.

The invention claimed is:
1. A video display system, comprising:
a tone mapping processor that performs a tone mapping process of converting a luminance of a video by using conversion characteristics according to a maximum luminance of the video; and
a display that displays the video that has undergone the tone mapping process,
wherein the tone mapping processor switches between a first tone mapping process of dynamically changing the conversion characteristics according to a time-dependent change in the maximum luminance of the video and a second tone mapping process that is performed using constant conversion characteristics irrespective of the change in the maximum luminance of the video, and
when the tone mapping process used is switched from the second tone mapping process to the first tone mapping process, the conversion characteristics used is changed gradually or stepwise from the constant conversion characteristics to dynamically changing conversion characteristics within a plurality of frames.

2. The video display system according to claim 1, further comprising:
a composer that overlays graphics on a main video to generate the video,
wherein the tone mapping processor performs the first tone mapping process when the graphics are not overlaid on the main video, and performs the second tone mapping process when the graphics are overlaid on the main video.

3. The video display system according to claim 2,
wherein the composer generates a first flag that indicates whether or not the graphics are overlaid with the main video, and
the tone mapping processor determines which of the first tone mapping process and the second tone mapping process is to be performed according to the first flag.

4. The video display system according to claim 3,
wherein the graphics include subtitles and a menu, and
the first flag includes a second flag that indicates whether or not the subtitles are overlaid on the main video and a third flag that indicates whether or not the menu is overlaid on the main video.

5. The video display system according to claim 3,
wherein the graphics are subtitles,
the first flag indicates a subtitles display period, which is a time period during which the subtitles are intermittently displayed, and a subtitles non-display period during which the subtitles are not displayed for a predetermined length of time or longer, and
the tone mapping processor performs the second tone mapping process during the subtitles display period, and performs the first tone mapping process during the subtitles non-display period.

6. The video display system according to claim 2,
wherein, in the second tone mapping process,
with respect to a luminance greater than or equal to a border luminance level, the tone mapping processor dynamically changes the conversion characteristics according to the time-depending change in the maximum luminance of the video, and
with respect to a luminance less than the border luminance level, the tone mapping processor uses the constant conversion characteristics irrespective of the change in the maximum luminance of the video.

7. The video display system according to claim 1,
wherein, when switching from the first tone mapping process to the second tone mapping process, the tone mapping processor continuously uses the conversion characteristics used immediately before the switching in the second tone mapping process.

8. A video display method in a video display system, the video display method comprising:
reproducing a video from a non-transitory medium;
performing a tone mapping process of converting a luminance of the video by using conversion characteristics according to a maximum luminance of the video; and
displaying the video that has undergone the tone mapping process,
wherein, in the tone mapping process, switching is performed between a first tone mapping process of dynamically changing the conversion characteristics according to a time-dependent change in the maximum luminance of the video and a second tone mapping process that is performed using constant conversion characteristics irrespective of the change in the maximum luminance of the video, and
when the tone mapping process used is switched from the second tone mapping process to the first tone mapping process, the conversion characteristics used is changed gradually or stepwise from the constant conversion characteristics to dynamically changing conversion characteristics over a plurality of frames.

* * * * *